United States Patent
Izumi et al.

(10) Patent No.: US 10,925,443 B2
(45) Date of Patent: *Feb. 23, 2021

(54) HOUSEHOLD TISSUE PAPER AND HYDROLYSABLE SHEET

(71) Applicant: DAIO PAPER CORPORATION, Ehime (JP)

(72) Inventors: Shinya Izumi, Ehime (JP); Asako Tanaka, Ehime (JP); Atsuko Hasezawa, Tochigi (JP); Shinpei Mukoyama, Ehime (JP); Kosuke Yamazaki, Ehime (JP)

(73) Assignee: DAIO PAPER CORPORATION, Ehime (JP)

( * ) Notice: Subject to any disclaimer, the term of this patent is extended or adjusted under 35 U.S.C. 154(b) by 58 days.

This patent is subject to a terminal disclaimer.

(21) Appl. No.: 15/560,665

(22) PCT Filed: Mar. 30, 2016

(86) PCT No.: PCT/JP2016/060499
§ 371 (c)(1),
(2) Date: Sep. 22, 2017

(87) PCT Pub. No.: WO2016/159145
PCT Pub. Date: Oct. 6, 2016

(65) Prior Publication Data
US 2018/0098672 A1 Apr. 12, 2018

(30) Foreign Application Priority Data

Mar. 31, 2015 (JP) .............................. JP2015-070614
May 29, 2015 (JP) .............................. JP2015-110827
(Continued)

(51) Int. Cl.
*A47K 10/16* (2006.01)
*B31F 1/07* (2006.01)
(Continued)

(52) U.S. Cl.
CPC .............. *A47K 10/16* (2013.01); *A47L 13/16* (2013.01); *A47L 13/17* (2013.01); *B31F 1/07* (2013.01);
(Continued)

(58) Field of Classification Search
CPC . A47K 10/16; A47K 2010/3266; A47L 13/17; A47L 13/16; B31F 1/07;
(Continued)

(56) References Cited

U.S. PATENT DOCUMENTS

| 3,868,205 A * | 2/1975 | Thomas | B31F 1/07 425/363 |
| 5,281,306 A | 1/1994 | Kakiuchi et al. | |

(Continued)

FOREIGN PATENT DOCUMENTS

| JP | H02-229295 | 9/1990 |
| JP | H03-193996 | 8/1991 |

(Continued)

OTHER PUBLICATIONS

Translation of JP 2007-209657A. (Year: 2007).*
(Continued)

*Primary Examiner* — Catherine A. Simone
(74) *Attorney, Agent, or Firm* — IPUSA, PLLC

(57) ABSTRACT

Household tissue paper is obtained by applying a ply process to two or more sheets of base paper. First embossments and second embossments, arranged around the first embossments, are formed on an entire surface of the household tissue paper, a shape of a protruding part of each of the second embossments differing from a shape of a protruding part of each of the first embossments. Hence, because a contact area with an object to be cleaned or the like can be (Continued)

increased, it is possible to enhance surface strength of the household tissue paper being embossed and to enhance wiping performance.

10 Claims, 9 Drawing Sheets

(30) Foreign Application Priority Data

| | | |
|---|---|---|
| May 29, 2015 | (JP) | JP2015-110831 |
| Jun. 16, 2015 | (JP) | JP2015-121313 |

(51) Int. Cl.

| | |
|---|---|
| *A47L 13/16* | (2006.01) |
| *D21H 27/00* | (2006.01) |
| *D21H 27/02* | (2006.01) |
| *D21H 27/30* | (2006.01) |
| *D21H 21/20* | (2006.01) |
| *B32B 3/30* | (2006.01) |
| *A47L 13/17* | (2006.01) |
| *D21H 17/25* | (2006.01) |
| *D21H 17/70* | (2006.01) |
| *A47K 10/32* | (2006.01) |
| *B32B 3/26* | (2006.01) |
| *B32B 5/26* | (2006.01) |

(52) U.S. Cl.
CPC ............... *B32B 3/30* (2013.01); *D21H 21/20* (2013.01); *D21H 27/00* (2013.01); *D21H 27/002* (2013.01); *D21H 27/02* (2013.01); *D21H 27/30* (2013.01); *A47K 2010/3266* (2013.01); *B31F 2201/0733* (2013.01); *B31F 2201/0738* (2013.01); *B31F 2201/0761* (2013.01); *B32B 3/263* (2013.01); *B32B 5/26* (2013.01); *D21H 17/25* (2013.01); *D21H 17/70* (2013.01); *Y10T 428/24463* (2015.01); *Y10T 428/24479* (2015.01)

(58) Field of Classification Search
CPC ...... B31F 2201/0733; B31F 2201/0738; B31F 2201/0761; D21H 27/02; D21H 27/002; D21H 21/20; D21H 27/00; D21H 27/30; D21H 17/25; D21H 17/70; Y10T 428/24455; Y10T 428/24463; B32B 3/263; B32B 3/30; B32B 5/26
USPC .................................................. 428/153, 154
See application file for complete search history.

(56) References Cited

U.S. PATENT DOCUMENTS

| | | | |
|---|---|---|---|
| 6,054,020 | A | 4/2000 | Goulet et al. |
| 6,106,928 | A * | 8/2000 | Laurent .............. B31F 1/07 428/152 |
| 6,132,557 | A | 10/2000 | Takeuchi et al. |
| 6,228,218 | B1 | 5/2001 | Takeuchi et al. |
| 6,455,129 | B1 | 9/2002 | Kershaw et al. |
| 6,699,806 | B1 | 3/2004 | Takeuchi et al. |
| 6,827,819 | B2 | 12/2004 | Dwiggins et al. |
| 2004/0118531 | A1 | 6/2004 | Shannon et al. |
| 2007/0110963 | A1 | 5/2007 | Uehara et al. |
| 2007/0128411 | A1 | 6/2007 | Kawai et al. |
| 2008/0076314 | A1 | 3/2008 | Blanz et al. |
| 2018/0098672 | A1 | 4/2018 | Izumi et al. |
| 2018/0146834 | A1 | 5/2018 | Izumi et al. |

FOREIGN PATENT DOCUMENTS

| | | |
|---|---|---|
| JP | H11-152696 | 6/1999 |
| JP | H11-187983 | 7/1999 |
| JP | 2001-172851 | 6/2001 |
| JP | 2003-183971 | 7/2003 |
| JP | 3865506 | 1/2007 |
| JP | 2007-154359 | 6/2007 |
| JP | 2007-209657 | 8/2007 |
| JP | 2008-094067 | 4/2008 |
| JP | 2011-030793 | 2/2011 |
| JP | 2012-106123 | 6/2012 |
| JP | 2013-237957 | 11/2013 |

OTHER PUBLICATIONS

U.S. Office Action for U.S. Appl. No. 15/576,750 dated Feb. 26, 2019.
U.S. Office Action for U.S. Appl. No. 15/576,750 dated Apr. 24, 2019.
U.S. Office Action for U.S. Appl. No. 15/576,931 dated Jan. 11, 2019.
U.S. Notice of Allowance for U.S. Appl. No. 15/576,931 dated Apr. 24, 2019.
Japanese Office Action for 2015-121313 dated Jul. 31, 2017.
International Search Report for PCT/JP2016/060499 dated Jun. 28, 2016.
International Search Report for PCT/JP2016/060500 dated Jul. 5, 2016.
Japanese Office Action for 2015-121313 dated Oct. 13, 2017.
Japanese Office Action for 2015-110837 dated May 24, 2016.
Japanese Office Action for 2015-110837 dated Oct. 17, 2016.
Japanese Office Action for 2015-110839 dated May 24, 2016.
Japanese Office Action for 2015-110839 dated Oct. 17, 2016.
International Search Report for PCT/JP2016/060510 dated Jul. 5, 2016.
U.S. Office Action for U.S. Appl. No. 15/576,931 dated Jun. 27, 2019.
U.S. Office Action for U.S. Appl. No. 15/576,931 dated Dec. 10, 2019.
U.S. Final Office Action for U.S. Appl. No. 15/576,931 dated Aug. 31, 2020.
U.S. Office Action for U.S. Appl. No. 15/576,931 dated May 7, 2020.

\* cited by examiner

HOUSEHOLD TISSUE PAPER AND HYDROLYSABLE SHEET

TECHNICAL FIELD

The present invention relates to household tissue paper and a hydrolysable sheet.

BACKGROUND ART

Currently, as household tissue paper such as toilet cleaning sheets or kitchen cleaning sheets, a sheet obtained by applying a ply process to a plurality of pieces of base paper, such as crepe paper, is generally used in order to enhance texture, absorbability, bulkiness, and the like. Then, such household tissue paper is embossed in order to enhance its surface strength.

For example, bulky paper is disclosed that is obtained by being embossed in a state of containing water so as to be able to have a thickness such that embossments are less likely to deform even when being pulled after being embossed (for example, see Patent Document 1).

Further, for example, an industrial wipe is disclosed on which a plurality of linear embossments are formed so as to form a grid pattern and a plurality of hexagonal embossments are formed at respective grid areas surrounded by the grid pattern so as to form a hexagonal pattern such that the industrial wipe has excellent wiping and absorbing properties for dust, high-viscosity grease, low-viscosity water, and the like, and the amount of paper dust is reduced (for example, see Patent Document 2).

Conventionally, reusable wiping cloths made of woven fabrics are used to clean toilets. Recently, however, disposable wet sheets made of paper are used instead. It is preferable that such a wet sheet is provided in a state of being impregnated with a cleaning agent, and can be disposed of by being flushed down a toilet after use. For the disposable wet sheet, the wet paper impregnated with a cleaning agent is required to be strong enough to resist tearing at the time of wiping, and hydrolyzability is required so as not to clog a pipe or the like when being flushed down a toilet. As a technique for effectively achieving these, it is known to use a water-disintegrable sheet, to which a water-soluble binder or the like containing carboxymethyl cellulose (CMC) is added, as base paper (for example, see Patent Document 3).

RELATED-ART DOCUMENTS

Patent Document

Patent Document 1: Japanese Unexamined Patent Application Publication No. 2008-094067
Patent Document 2: Japanese Unexamined Patent Application Publication No. 2012-106123
Patent Document 3: Japanese Examined Patent Publication No. 3865506

SUMMARY OF THE INVENTION

Problem to be Solved by the Invention

However, although surface strength of the household tissue paper (such as bulky paper) disclosed in Patent Documents 1 and 2 is enhanced by being embossed, such household tissue paper has a problem in that a contact area of the household tissue paper is reduced, and wiping performance for wiping cleaning is decreased.

An object of the present invention is to provide household tissue paper having an increased contact area and high wiping performance as well as enhancing surface strength of the household tissue paper by embossing.

Means to Solve the Problem

In order to solve the above described problem, one aspect of the invention is household tissue paper obtained by applying a ply process to two or more sheets of base paper,
wherein first embossments and second embossments, arranged around the first embossments, are formed on an entire surface, a shape of a protruding part of each of the second embossments differing from a shape of a protruding part of each of the first embossments.

One aspect of the invention is characterized in that the first embossments are arrayed in a rhomboid grid.

One aspect of the invention is characterized in that each of the second embossments is arrayed between two of the first embossments.

One aspect of the invention is characterized in that the first embossments contact the second embossments to form a conjoined embossment.

One aspect of the invention is characterized in that the household tissue paper is a toilet cleaning sheet.

One aspect of the invention includes a multi-ply base paper sheet that is substantially water-dispersible, the multi-ply base paper sheet containing pulp and a water-soluble binder and being impregnated with an aqueous chemical agent, wherein
a basis weight of the multi-ply base paper sheet is 30 gsm to 150 gsm,
a content of the water-soluble binder increases towards a front surface and/or a back surface, and
first embossments and second embossments, arranged around the first embossments, are formed on an entire surface, a shape of a protruding part of each of the second embossments differing from a shape of a protruding part of each of the first embossments.

One aspect of the invention is obtained by impregnating a base paper sheet, to which a water-soluble binder is added, with a chemical solution, wherein
the base paper sheet is obtained by applying a ply process to a plurality of sheets of base paper and has a basis weight of from 30 gsm to 150 gsm,
a compounding ratio of softwood pulp to hardwood pulp is less than 1/1,
a content of the water-soluble binder increases from inside towards a front surface and a back surface in a thickness direction of the base paper sheet,
the chemical solution includes a cross-linking agent that causes the water-soluble binder to initiate a cross-linking reaction and a sterilizing agent,
the base paper sheet is impregnated with the chemical solution at 150% to 300% by weight with respect to a weight of the base paper sheet, and
first embossments and second embossments, arranged around the first embossments, are formed on an entire surface, a shape of a protruding part of each of the second embossments differing from a shape of a protruding part of each of the first embossments.

One aspect of the invention is characterized in that the first embossments are arrayed in a rhomboid grid.

One aspect of the invention is characterized in that each of the second embossments is arrayed between two of the first embossments.

One aspect of the invention is characterized in that the first embossments contact the second embossments to form a conjoined embossment.

One aspect of the invention includes a multi-ply base paper sheet that is substantially water-dispersible, the multi-ply base paper sheet containing pulp and a water-soluble binder and being impregnated with an aqueous chemical agent, wherein a basis weight of the multi-ply base paper sheet is 30 gsm to 150 gsm, when an abrasion resistance test by a rubbing fastness tester using a PP band as a pendulum is conducted three times both for an MD direction and a CD direction, two averages respectively for three measured values are greater than or equal to 40, and first embossments and second embossments, arranged around the first embossments, are formed on an entire surface, a shape of a protruding part of each of the second embossments differing from a shape of a protruding part of each of the first embossments.

One aspect of the invention is characterized in that the average value for the MD direction is greater than or equal to 45, and the average value for the CD direction is greater than or equal to 50.

One aspect of the invention is characterized in that a content of the water-soluble binder increases towards a front surface and/or a back surface.

Advantage of the Invention

According to the present invention, by forming first embossments, each of which has a curved surface protruding part, and second embossments, each of which has a planar protruding part, a contact area with an object to be cleaned or the like can be increased. Therefore, it is possible to provide household tissue paper or a hydrolysable sheet having high wiping performance as well as enhancing surface strength of the household tissue paper or the hydrolysable sheet by embossing.

MODE FOR CARRYING OUT THE INVENTION

In the following, household tissue paper (a hydrolysable sheet) that is an embodiment of the present invention will be described in detail with reference to the accompanying drawings. It should be noted that the scope of the invention is not limited to the illustrated examples.

It should be noted that for household tissue paper (a hydrolysable sheet) as the present invention, an example will be described in which the household tissue paper (the hydrolysable sheet) is a toilet cleaning sheet 100. However, other than toilet cleaning sheets, a wet tissue impregnated with a chemical solution for cleaning/wiping is included as the household tissue paper (the hydrolysable sheet) of the present invention. Further, a conveying direction of paper at the time of producing the toilet cleaning sheet 100 is described as the Y direction (longitudinal direction), and a direction perpendicular to the conveying direction is described as the X direction (lateral direction).

<Configuration of the Toilet Cleaning Sheet 100>

Figure 1:
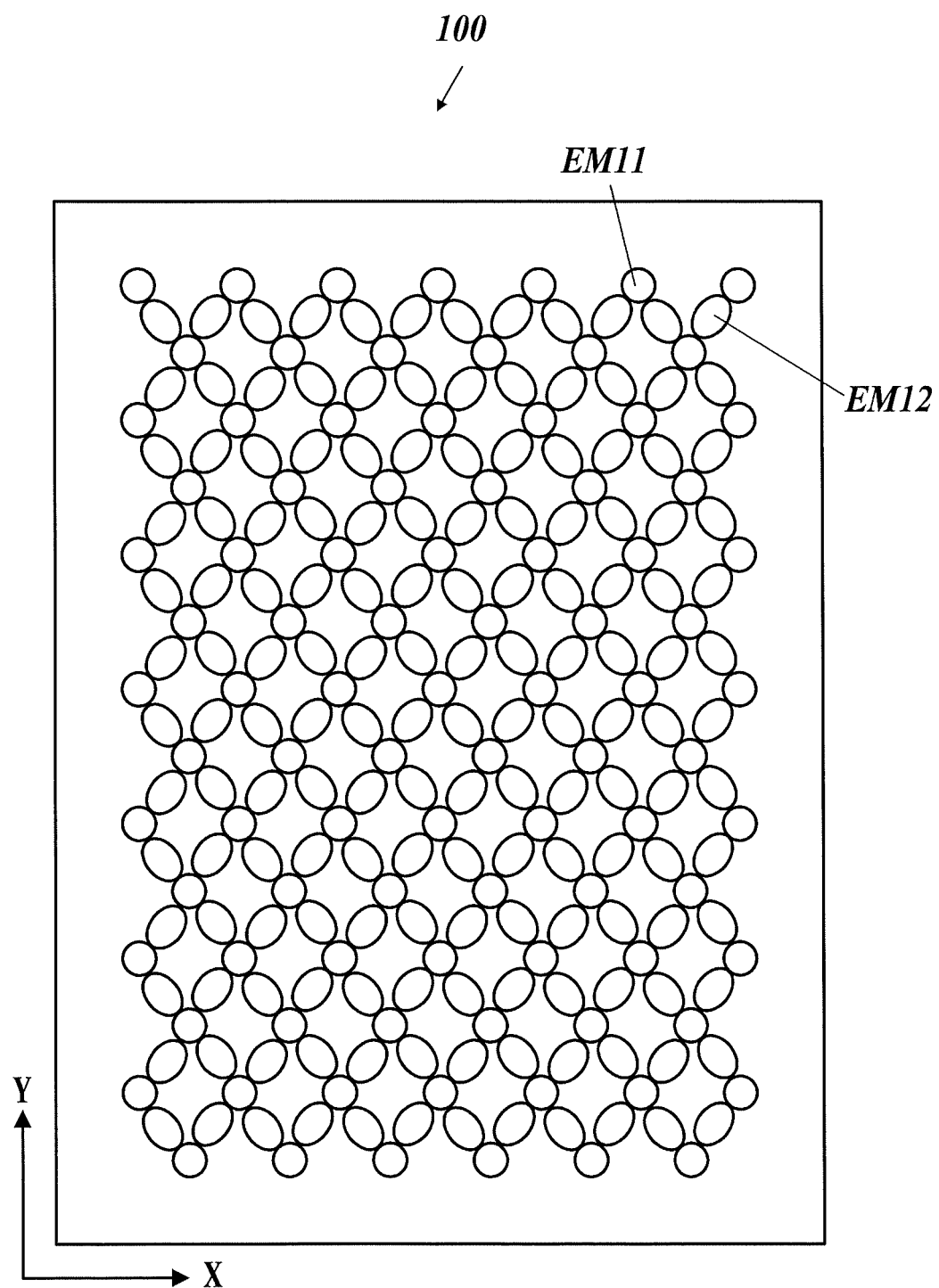
FIG. 1 is a plan view illustrating an example of a toilet cleaning sheet according to an embodiment.

First, a configuration of the toilet cleaning sheet 100 will be described. The toilet cleaning sheet 100 is obtained by applying a ply process to (obtained by stacking) a plurality of sheets (two sheets, for example) of base paper, and is impregnated with a predetermined chemical solution. Further, as illustrated in FIG. 1, an embossing process is applied to the entire sheet surface of the toilet cleaning sheet 100 to have two types of embossments EM11 and EM12. It should be noted that it is preferable that a contact area generated between an object to be cleaned up or the like and the two types of embossments EM11 and EM22 is preferably about 15 mm$^2$ to 30 mm$^2$ per 100 mm$^2$.

For example, unevenness of wiping can be reduced by arranging the embossments EM11 in rhomboid grids, in comparison with a case in which the embossments EM11 are arranged in square grids or rectangular grids. Further, the embossments EM12 are arranged between the embossments EM11.

Further, a folding process is applied to the toilet cleaning sheet 100 to fold it in two at the central portion in the Y direction. Then, the folded toilet cleaning sheet 100 is stored, within a plastic case, a packaging film, or the like for storage, and, at the time of being used, is unfolded as needed to be used. It should be noted that the manner of folding the toilet cleaning sheet 100 is not limited to folding it into two, but may be folding it into four or folding it into eight, for example.

Further, a base paper sheet of the toilet cleaning sheet 100 of the embodiment is composed of a hydrolysable fiber assembly such that after cleaning a toilet, the toilet cleaning sheet 100 can be discarded in the water tank of the toilet bowl.

A fiber obtained by mixing leaf bleached kraft pulp (LBKP) with needle bleached kraft pulp (NBKB) is used as the fiber assembly. A preferable material fiber has a compounding proportion of leaf bleached kraft pulp to components of the material fiber greater than 50% by weight. That is, a fiber of which a compounding ratio of needle bleached kraft pulp to leaf bleached kraft pulp is less than 1/1 is preferable. By increasing the compounding ratio of leaf bleached kraft pulp with respect to needle bleached kraft pulp, clearances between the fibers can be decreased and evaporation of water in the chemical solution can be suppressed. Therefore, the paper does not easily dry. Further, in order to enhance the surface strength of the base paper sheet serving as a base material of the toilet cleaning sheet 100, a solution containing carboxymethyl cellulose (CMC) is applied, as a binder solution for enhancing paper strength, to the base paper sheet from the front surface and the back surface. Thereby, the toilet cleaning sheet 100 is in a state in which a content of CMC increases from the center towards the front surface and the back surface in a thickness direction of the base paper sheet. Thereby, the toilet cleaning sheet 100 is less likely to be torn even when strongly rubbing an edge of a toilet bowl or the like relative to a conventional toilet cleaning sheet uniformly impregnated with a water-soluble binder.

The toilet cleaning sheet 100 is made such that, when an abrasion resistance test by a rubbing fastness tester using a PP band as a pendulum is conducted three times both for an MD direction and a CD direction, two respective average values of the three measured values are greater than or equal to 40 times. In a method of the above described abrasion resistance test, the toilet cleaning sheet 100 is folded into three and a measured portion is rubbed by the rubbing fastness tester to measure the number of times at which point damage such as tearing or fuzzing is visually identified on the paper surface. In consideration of a situation in which a toilet cleaning sheet is used in practice, that is, in consideration of a state in which an edge or the like of a toilet bowl is textured due to attached dirt, a PP band, to which surface a mesh pattern is applied, is used as the pendulum in the above described abrasion resistance test. Thereby, an environmental test can be performed in consideration of a toilet cleaning sheet used in practice, and it is possible to conduct a reliable test as to whether a toilet cleaning sheet i. Further, in the above described abrasion resistance test, a condition for a toilet cleaning sheet to be able to endure at the time of use in practice is 40 or more times as a standard. 45 or more times in the MD direction are more preferable and 50 or more times in the CD direction are more preferable.

Figure 2A:
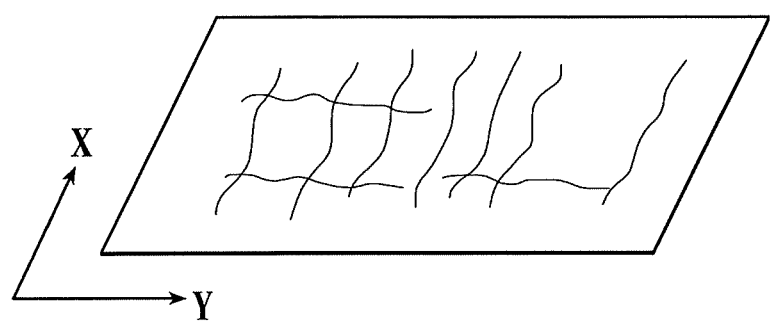
FIG. 2A is a diagram illustrating a fiber orientation of conventional paper.
Figure 2B:
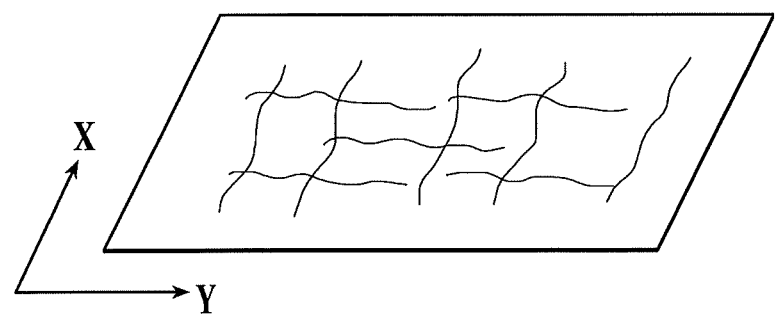
FIG. 2B is a diagram illustrating a fiber orientation of the present invention.

Further, a longitudinal/lateral ratio of a fiber orientation (longitudinal/lateral) of the toilet cleaning sheet 100 is preferably from 0.8 to 2.0 and is more preferably 1.0. Because fibers are placed on a wire of a papermaking machine in a papermaking process, which is a process of producing paper, to be conveyed in a conveying direction, in general, paper has characteristics in that many fibers are arranged in the longitudinal direction that is the conveying direction of the papermaking machine (for example, longitudinal:lateral=2.3:1, refer to FIG. 2A). That is, fiber density in the lateral direction is low and fibers easily tear in the lateral direction. That is, fibers easily tear depending on a wiping direction. Hence, according to the embodiment, as illustrated in FIG. 2B, the toilet cleaning sheet 100 has a longitudinal/lateral ratio of a fiber orientation of from 0.8 to 2.0, and 1.0 preferably. Thereby, it is possible to provide the toilet cleaning sheet 100 that does not easily tear even when being used to wipe in any direction. It should be noted that the longitudinal/lateral ratio of the fiber orientation can be obtained based on a ratio of wet strength in MD and CD directions.

Further, the toilet cleaning sheet 100 of the embodiment is impregnated with a predetermined chemical solution (aqueous chemical agent). Specifically, the predetermined chemical solution contains auxiliary agents such as a perfume, a preservative agent, a sterilizing agent, a paper strength enhancing agent, and an organic solvent, in addition to an aqueous cleaning agent. It is preferable that, with respect to a weight of the base paper sheet that is the base material of the toilet cleaning sheet 100, the base paper sheet is impregnated with the predetermined chemical solution at 150% to 300% by weight.

Any appropriate chemical solution may be used as the predetermined chemical solution. For example, in addition to a surfactant, a lower or higher (aliphatic) alcohol can be used as the aqueous cleaning agent. As the perfume, in addition to an aqueous perfume, one or several kinds can be selected from among oily perfumes such as orange oil. As the preservative agent, parabens such as methylparaben, ethylparaben, or propylparaben can be used, for example. As the sterilizing agent, benzalkonium chloride, chlorhexidine gluconate, povidone iodine, ethanol, cetyl benzanium oxide, triclosan, chloroxylenol, isopropylmethylphenol, or the like can be used, for example. As the paper strength enhancing agent (cross-linking agent), boric acid, various metal ions, or the like can be used. As the organic solvent, a polyhydric alcohol such as glycol (dihydric), glycerin (trihydric), or sorbitol (tetrahydric) can be used.

Further, the auxiliary agents of the components of the chemical solution described above can be appropriately selected and a component for satisfying another function may be contained in the chemical solution as needed.

Figure 3A:
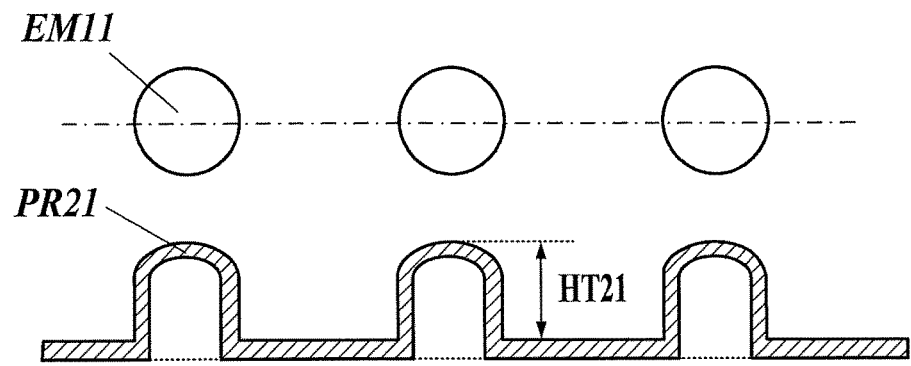
FIG. 3A is an enlarged view and a cross sectional view of an embossed part of the toilet cleaning sheet.

As illustrated in FIG. 3A, a protruding part PR21 of each embossment EM11 has a curved surface shape.

Figure 3B:
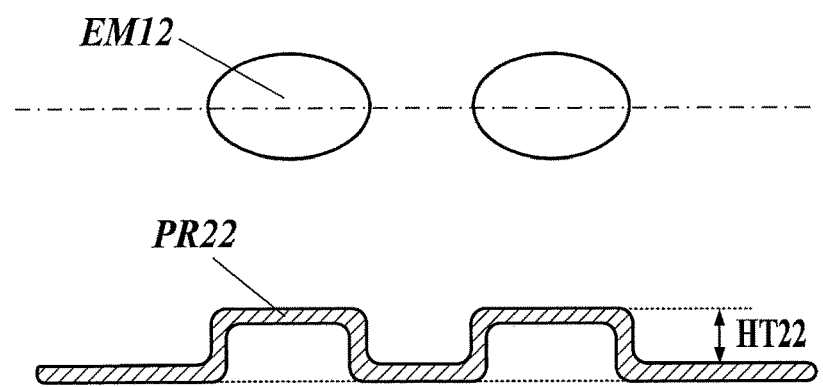
FIG. 3B is an enlarged view and a cross sectional view of an embossed part of the toilet cleaning sheet.

Further, as illustrated in FIG. 3B, a protruding part PR22 of each embossment EM12 has a planar shape.

Figure 3C:
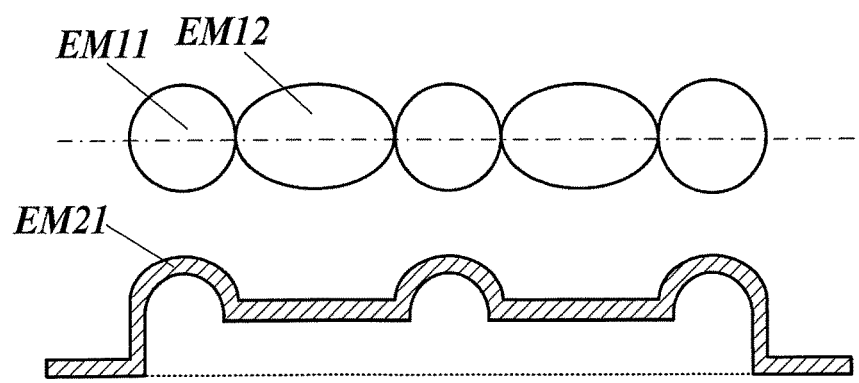
FIG. 3C is an enlarged view and a cross sectional view of an embossed part of the toilet cleaning sheet.

Because the embossments EM12 are arranged between the embossments EM11, the protruding parts PR21 of the embossments EM11 and the protruding parts PR22 of the EM12 are close to cohere, and thereby, a conjoined embossment EM21 is formed as illustrated in FIG. 3C. Alternatively, the protruding parts PR21 of the embossments EM11 and the protruding parts PR22 of the embossments EM12 may be simply close to each other without being conjoined.

By the two types of embossments EM11 and EM12 formed in this manner, a contact area with an object to be cleaned or the like can be increased. Therefore, hardness of the toilet cleaning sheet 100 is eased and the wiping performance is enhanced.

That is, by forming in combination, on the entire sheet surface of the toilet cleaning sheet 100, the embossments EM11 each of which has the protruding part PR21 with the curved surface and the embossments EM12 each of which has the protruding part PR22 with the planar surface, the contact area is increased only after each embossment is deformed when force is applied to the toilet cleaning sheet 100 at the time of wiping. Thus, as well as increasing the contact area, flexibility is also enhanced as a result of the deformation of each embossment.

Figure 4A:
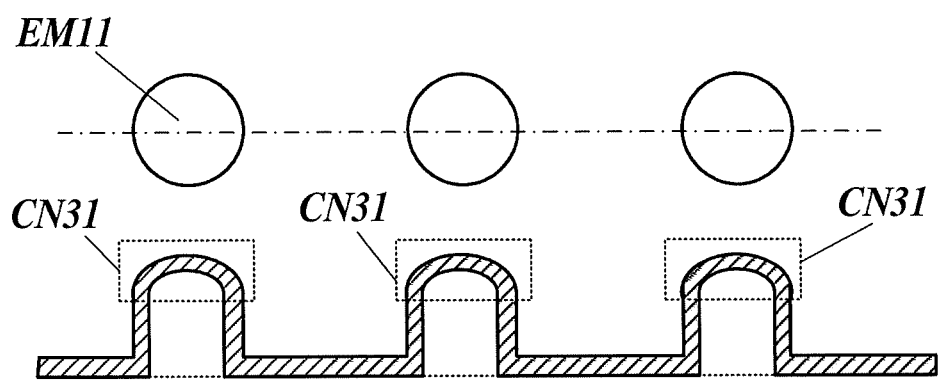
FIG. 4A is an explanatory diagram illustrating an example of contact areas of embossments.
Figure 4B:
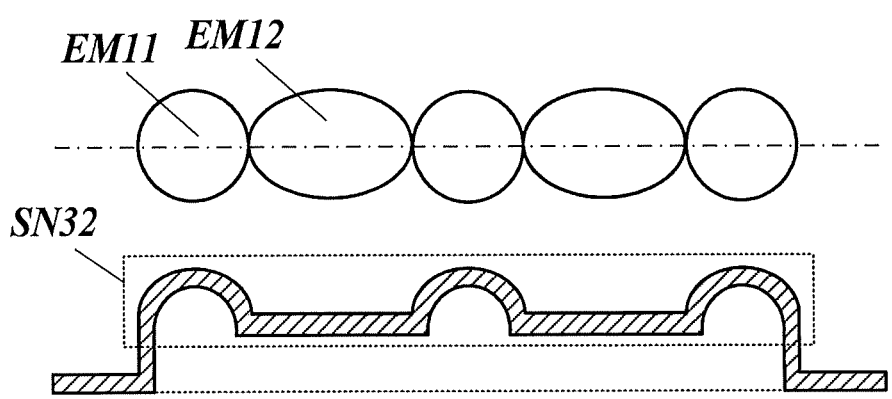
FIG. 4B is an explanatory diagram illustrating an example of a contact area of embossments.

For example, as illustrated in FIG. 4A, in a case where only the embossments EM11 are formed, contact areas CN31 generated by deformation of the embossments EM11 caused by force applied to the toilet cleaning sheet 100 at the time of wiping work discretely occur adjacent to the embossments EM11. On the other hand, in a case where the two types of embossments EM11 and EM12 are used in combination, as illustrated in FIG. 4B, a contact area CN32 generated by deformation of the embossments EM11 and EM12 caused by force applied to the toilet cleaning sheet 100 at the time of wiping work is increased in comparison with the contact areas CN31 of FIG. 4A.

Further, by the two types of embossments EM11 and EM12, effects of normal embossments can be similarly obtained, and texture, absorbability, bulkiness, and the like of the toilet cleaning sheet can be enhanced. Furthermore, by the conjoined embossment EM21, a good appearance effect based on applying the embossments can be obtained similar to normal embossments.

[Method of Producing the Toilet Cleaning Sheet 100]

Figure 5:
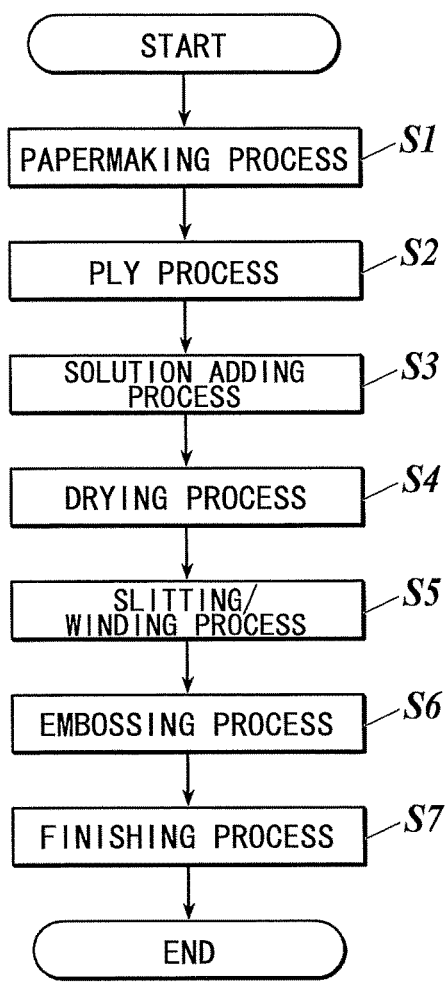
FIG. 5 is a flowchart illustrating a method of producing the toilet cleaning sheet according to the embodiment.
Figure 6:
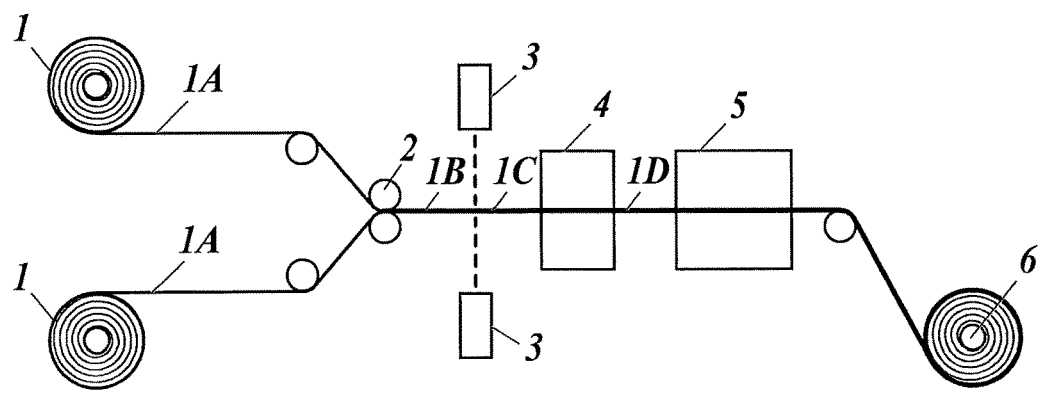
FIG. 6 is a schematic diagram illustrating an example of a producing facility (liquid solution adding facility) of the toilet cleaning sheet according to the embodiment.
Figure 7:
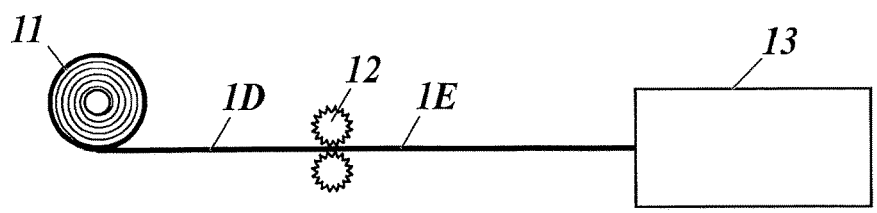
FIG. 7 is a schematic diagram illustrating an example of a producing facility (processing facility) of the toilet cleaning sheet according to the embodiment.

Next, a method of producing the toilet cleaning sheet 100 will be described. FIG. 5 is a flowchart illustrating the method of producing the toilet cleaning sheet 100. FIG. 6 is a schematic diagram of a liquid solution adding facility that adds, to the base paper sheet of the toilet cleaning sheet 100, a binder solution. FIG. 7 is a schematic diagram of a processing facility that processes the base paper sheet to which the binder solution has been added by the solution adding facility illustrated in FIG. 6.

In the method of producing the toilet cleaning sheet 100, as illustrated in FIG. 5, first, a papermaking process (S1) is performed by a papermaking machine (not illustrated) to prepare paper as base paper.

Next, as illustrated in FIG. 5 and FIG. 6, in the solution adding facility, a ply process (S2) to obtain a ply continuous sheet 1B is applied to continuous dry base paper 1A and 1A respectively fed from a plurality of (two, for example) primary web rollers 1 and 1, around which the prepared base paper is wound. A solution adding process (S3) is performed to add the binder solution to the ply continuous sheet 1B to obtain a continuous sheet 1C. A drying process (S4) is performed to dry the continuous sheet 1C. A slitting/winding process (S5) is performed to slit and wind the dried continuous hydrolysable sheet 1D. It should be noted that the number of primary web rollers may be changed as appropriate if the number is two or more. In the following description, an example will be described in which two rollers are used.

Next, as illustrated in FIG. 5 and FIG. 7, in the processing facility, an embossing process (S6) is performed to emboss the continuous hydrolysable sheet 1D, wound in the above described slitting/winding process (S5) and fed from a secondary web roller 11. A finishing process (S7) is performed to finish the embossed sheet 1E, to which the embossing process has been applied. Note that each of the processes will be described in detail later below.

(Papermaking Process)

First, the papermaking process according to the embodiment will be described. In the papermaking process (S1) of the present invention, for example, a papermaking material is used by a known wet type papermaking technique to form the base paper sheet. That is, after wetting the papermaking material, the material is dried by a dryer or the like to form the base paper sheet such as tissue paper or crepe paper. As a material of the base paper sheet, for example, known virgin pulp, recycled paper pulp, or the like may be used, and at least a pulp fiber is included. In particular, pulp obtained by mixing LBKP with NBKP in an appropriate proportion is suitable for the pulp to be the material. It should be noted that a rayon fiber, a synthetic fiber, or the like may be contained as a fiber other than the pulp fiber. Further, the base paper sheet of the present invention contains, as a flocculant, an anionic acrylamide-type polymer (referred to as the "anionic PAM" in the following). The anionic PAM is a polymer obtained by copolymerizing an acrylamide-type monomer and an anionic monomer. The acrylamide-type monomer is acrylamide alone, or a mixture of acrylamide and a nonionic monomer, as follows, copolymerizable with acrylamide. Examples of the nonionic monomer copolymerizable with acrylamide include methacrylamide, N,N-dimethylacrylamide, N,N-diethylacrylamide, N-isopropylacrylamide, N-isopropylcrylamide, N-hydroxyethylacrylamide, diacetone acrylamide, acryloylmorpholine, N-acryloylpyrrolidine, N-acryloylpiperidine, N-vinylrolidone, N-vinylformamide, and N-vinylacetamide. One of them may be used or two or more kinds may be used in combination. Examples of the anionic monomer include acrylic acid, methacrylic acid, acrylamide-2-methylpropanesulfonic acid, itaconic acid, maleic acid, fumaric acid, and neutralized salts thereof. It should be noted that a monomer such as styrene, acrylonitrile, or (meth) acrylic acid ester may be blended as long as it does not impair the water solubility of the anionic PAM. It is preferable that an additive amount of the anionic PAM is approximately 10 ppm to 1000 ppm. By using such an anionic flocculant having an electric charge that is the same as that of pulp to make paper, the flocculation of the base paper sheet can be decreased and the hydrolyzability can be enhanced by a capillary action. It should be noted that in addition to the flocculant and pulp described above, chemicals for papermaking such as a wet paper strength agent, an adhesive agent, and a remover may be used as appropriate in the base paper sheet. Further, although the binder solution is added in the solution adding process of the solution adding facility, which will be described later below, in the embodiment of the present invention, the binder solution may be added in the papermaking process. In a case where the binder solution is also added in the papermaking process, the overall strength of an obtained hydrolysable sheet can be enhanced, and the surface strength of the hydrolysable sheet can be further enhanced by further adding the binder solution in the solution adding process as a subsequent process.

As a method of adding a binder solution in a papermaking process, for example, a method is known of adding, into a dispersion liquid including pulp that is papermaking material, a water-soluble binder and an agent that fixes the water-soluble binder to the pulp fiber, and using it as material to make wet paper (Japanese Laid-open Patent Publication No. H3-193996). That is a method of internally adding a water-soluble binder. Further, a fiber sheet containing a predetermined amount of a water-soluble binder may be produced by making a wet sheet from a dispersion liquid including pulp, spray drying or coating drying the water-soluble binder after press dewatering or half-drying. That is a method of externally adding a water-soluble binder. Here, a low-density fiber sheet having more preferable hydrolyzability can be obtained by using a pre-drying method, such as a hot air passing drying, machine than performing press dewatering. Further, alternatively the above described wet papermaking method, a fiber sheet may be produced by forming a pulp fiber in a dry system without using water, spraying a water-soluble binder after forming a web, and drying it. This referred to as an air laid production method.

Figure 13:
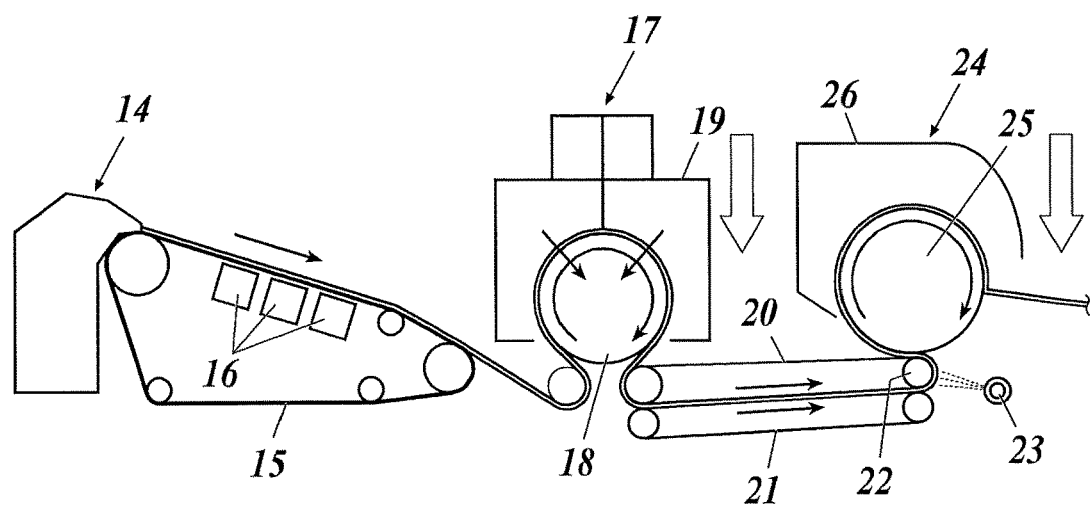
FIG. 13 is a schematic diagram illustrating an example of a papermaking machine.

FIG. 13 illustrates a schematic diagram of an example of a producing apparatus that is preferably used to produce a fiber sheet for when a water-soluble binder is used as a binder. The producing apparatus (wet papermaking machine) illustrated in FIG. 13 is configured to include a former 14, a wire part, a first dry part 17, a spray part, and a second dry part 24.

The former 14 adjusts a completed paper material, supplied from a preparing apparatus (not shown), to have a predetermined concentration and supplies the material to the wire part. The unshown preparing apparatus includes an apparatus that beats a material such as a pulp fiber, and an adding apparatus that adds, to the beaten material, additive agents such as a sizing agent, a pigment, a paper strength enhancing agent, a bleaching agent, and a flocculant. The preparing apparatus is configured to prepare a paper material made of a material having a predetermined concentration in accordance with characteristics of hydrolysable paper as the completed paper material. Further, it is possible to mix a binder with pulp slurry. The wire part forms the completed material supplied from the former into wet paper on a wire cloth. The first dry part 17 dries the wet paper formed in the wire part. The spray part sprays a binder on the paper dried by the first dry part 17. The second dry part 24 dries the wet paper to which the binder is sprayed by the spray part.

The completed material supplied from the former is made into paper in the wire part and wet paper is formed on the wire 15. Water of the wet paper is sucked in by suction boxes 16 placed in the wire part, and the wet paper is made to have a predetermined moisture percentage. Next, the wet paper is introduced into the first dry part 17 to be dried. The first dry part 17 is composed of a through air dryer (referred to as the TAD hereinafter). The TAD includes a rotating drum 18 and a hood 19. A peripheral surface of the rotating drum 18 is air permeable. The hood 19 substantially hermetically covers the rotating drum 18. In the TAD, air heated to be a predetermined temperature is supplied in the hood 19. The heated air flows towards inside from outside the rotating drum 18. The wet paper is conveyed in a state of being held on the peripheral surface of the rotating drum 18 that rotates in the arrow direction in FIG. 13. While being conveyed in the TAD, the heated air penetrates the wet paper in its thickness direction, and thereby the wet paper is dried to be paper.

On the paper obtained by the first dry part 17, an aqueous solution (binder solution) including a binder is sprayed in the spray part. The spray part is located between the first and second dry parts 17 and 24. The dry parts 17 and 24 are connected through a conveyer.

The conveyer includes an upper conveyer belt 20 and a lower conveyer belt 21 that respectively rotate in the directions indicated by the arrows. The conveyer 20 is configured to convey, to the second dry part 24, the paper, dried through the TAD of the first dry part 17, while sandwiching the paper between both belts 20 and 21. A vacuum roller 22 is arranged at a folding end downstream of the upper conveyer belt 20. The vacuum roller 22 is configured to attract the paper to the back surface of the upper conveyer belt 20 and to convey the upper conveyer belt 20 in the attracting state.

As illustrated in FIG. 13, the spray part includes a spray nozzle 23. The spray nozzle 23 is disposed, below the second dryer part 24, to face the vacuum roller 22. The spray nozzle 23 sprays the spray liquid including the binder towards the vacuum roller 22 to add (externally add) the spray liquid to the paper.

After the binder is supplied to the paper by the spray part, the paper is conveyed to the second dryer part 24. The second dryer part 24 is composed of a Yankee dryer. The wet paper, on which the spray liquid has been sprayed, is conveyed while being held on the peripheral surface of a rotating drum 25 of the Yankee dryer placed in the hood 26. The paper dries while being conveyed and held by the rotating drum 25.

It should be noted that the position where the binder is supplied at the spray part may be any position between the first and second dry parts 17 and 24. For example, the binder may be sprayed from a position above the upper conveyer belt 20 (from the arrow position between the first and second dry parts 17 and 24 illustrated in FIG. 13). Further, the binder may be sprayed, on the paper dried by the second dryer part 24, from a position above (from the arrow position at the right side of the second dry part 24 illustrated in FIG. 13). A direction of spraying the binder, between the first and second dry parts 17 and 24, and after the second dry part 24, is not limited to spraying from above but may be spraying from below or spraying from both above and below.

According to the embodiment, in the paper making process, a longitudinal/lateral ratio of a fiber orientation (longitudinal/lateral) of the base paper sheet is adjusted to be 0.8 to 2.0 and more preferably to be 1.0. The fiber orientation can be adjusted, for example, by adjusting, in a papermaking machine, an angle at which papermaking material is supplied to the wire part. For example, the angle, at which the papermaking material is supplied, can be adjusted by adjusting a slice opening of a headbox. Alternatively, a vibration may be given in a direction perpendicular to the conveying direction (traveling direction) by the papermaking machine to adjust the fiber orientation.

(Continuous Dry Base Paper)

It is preferable that the continuous dry base paper 1A has, as a physical property, a basis weight approximately of from 15 gsm to 75 gsm. Further, a basis weight of the sheet (the continuous hydrolysable sheet 1D), containing the water-soluble binder, to which the ply process has been applied is approximately of from 30 gsm to 150 gsm. It should be noted that the basis weight is based on the standard of JIS P 8124. The continuous dry base paper 1A becomes, through the ply process (S2), the solution adding process (S3), the drying process (S4), and the slitting/winding process (S5) that are described later below, hydrolysable paper, to which the ply process has been applied, and the hydrolysable paper is processed into the toilet cleaning sheet 100 through the embossing process (S6), and the finishing process (S7) that are described later below.

(Ply Process)

Next, the ply process (S2) of the embodiment will be described. In the ply process (S2), as illustrated in FIG. 6, the ply process is applied to the respective continuous dry base paper 1A and 1A, continuously fed from the web rollers 1, along the continuous direction, and the continuous dry base paper 1A and 1A are supplied to an overlapping part 2 to make the ply continuous sheet 1B. The overlapping part 2 is composed of a pair of rollers and applies the ply process to the respective continuous base paper 1A and 1A to form the ply continuous sheet 1B, to which the ply process has been applied. Note that when the continuous dry base paper 1A and 1A are overlapped with each other, the continuous dry base paper 1A and 1A may be lightly fastened by pin embossments (contact embossments) so as not to misalign the continuous dry base paper 1A and 1A.

(Binder Solution)

Next, the binder solution will be described. The binder solution contains carboxymethyl cellulose (CMC) as a water-soluble binder. The concentration of carboxymethyl cellulose in the binder solution is 1% to 30% by weight. The concentration is preferably greater than or equal to 1% and less than 4% by weight.

A degree of etherification of CMC is preferably 0.6 to 2.0, is more preferably 0.9 to 1.8, and still more preferably 1.0 to 1.5. This develops excellent hydrolyzability and wet paper strength.

Further, water swellable material may be used as CMC. This enables, through cross-linking a specific metal ion in the chemical solution, to exert a function to keep an un-swelled fiber constituting the sheet and to impart strength as a wiping sheet to withstand cleaning/wiping work.

A component other than carboxymethyl cellulose included in the binder solution is a binder component such as polyvinyl alcohol, starch or a derivative thereof, hydroxypropyl cellulose, sodium alginate, tranth gum, guar gum, xanthan gum, gum arabic, carrageenan, galactomannan, gelatin, casein, albumin, purplan, poly ethylene oxide, viscose, polyvinyl ethyl ether, sodium polyacrylate, sodium polymethacrylate, polyacrylamide, a hydroxylated derivative of polyacrylic acid, or a polyvinyl pyrrolidone/vinyl pyrrolidone vinyl acetate copolymer.

It is preferable to use a water-soluble binder including a carboxyl group in terms of having suitable hydrolyzability and developing wet strength by a cross-linking reaction. The water-soluble binder including the carboxyl group is an anionic water-soluble binder that easily generates a carboxylate within water. An example of the binder is a polysaccharide derivative, a synthetic macromolecule, or a natural product. The polysaccharide derivative may be a salt of carboxymethyl cellulose, carboxyethyl cellulose or a salt thereof, carboxymethylated starch or a salt thereof. In particular, an alkali metal salt of carboxymethyl cellulose is preferable.

The synthetic macromolecule may be a salt of a polymer or a copolymer of unsaturated carboxylic acids, a salt of a copolymer of an unsaturated carboxylic acid and a monomer copolymerizable with the unsaturated carboxylic acid, or the like. The unsaturated carboxylic acid may be acrylic acid, methacrylic acid, itaconic acid, crotonic acid, maleic anhydride, maleic acid, fumaric acid or the like. The monomer copolymarizable with these unsaturated carboxylic acids may be an ester of these unsaturated carboxylic acids, vinyl acetate, ethylene, acrylamide, vinyl ether, or the like. As the synthetic macromolecule, a macromolecule that uses acrylic acid or methacrylic acid as an unsaturated carboxylic acid is particularly preferable. Specifically, polyacrylic acid, polymethacrylic acid, a salt of a copolymer of acrylic acid and methacrylic acid, or a salt of a copolymer of acrylic acid or methacrylic acid and alkyl acrylate or alkyl methacrylate is particularly preferable. The natural product may be sodium alginate, xanthan gum, gellan gum, tragacanth gum, pectin or the like.

(Solution Adding Process)

Next, the solution adding process (S3) of the embodiment will be described. In the solution adding process (S3), as illustrated in FIG. 6, the above described binder solution is sprayed from respective two-fluid-type or single-fluid-type spray nozzles 3 and 3 on both external surfaces of the ply continuous sheet 1B (surfaces for which the continuous dry base paper 1A and 1A do not face each other at the time of applying the ply process to the continuous dry base paper 1A and 1A) to generate the continuous sheet 1C. The ply continuous sheet 1B, immediately after the ply process applied, is in a state in which the continuous dry base paper 1A and 1A are simply overlapped. Therefore, when the binder solution is applied from the spray nozzles 3 and 3 to both surfaces of the ply continuous sheet 1B in the solution adding process, the binder solution is added in a way substantially similar to a case in which the binder solution is added in a state in which the continuous dry base paper 1A and 1A are away from each other. Then, the binder solution penetrates in the thickness direction, the sheets stick to each other as they are conveyed, and the binder solution further penetrates into the sheets while the sheets are pressure-joined in the slitting/winding process. It should be noted that, as a method of spraying a binder solution, the binder solution may be sprayed on either external surface of the ply continuous sheet 1B. Further, immediately after the respective two-fluid-type spray nozzles spray the above described binder solution to at least one external sheet surface of the continuous dry base paper 1A and 1A respectively fed from the above described primary web rollers 1 and 1 (to surfaces that the respective sheets do not face), a ply process may be applied to the continuous dry base paper 1A and 1A so as to generate a sheet equivalent to the above described continuous sheet 1C.

Each of the two-fluid-type spray nozzles 3 is a type of a spray nozzle that mixes and sprays liquid and compressed air divided into two systems, and is able to finely and uniformly spray liquid relative to a single-fluid-type spray nozzle that singly sprays compressed liquid. In a case where two-fluid-type spray nozzles are used in the embodiment, because the two-fluid-type spray nozzles apply, at a high pressure (spraying pressure that is higher than or equal to 1.5 MPa), the binder solution (having viscosity of 400 MPa·s to 1200 MPa·s) to each of the external surfaces of the ply continuous sheet 1B to which the ply process has been applied, the binder solution is easily added in the thickness direction of the sheet. In contrast, in a case where single-fluid-type spray nozzles are used in the embodiment, the single-fluid-type spray nozzles apply, at a spraying pressure lower than or equal to 1.5 MPa, the binder solution (having viscosity of 400 MPa·s to 1200 MPa·s) to each of the external surfaces of the ply continuous sheet 1B to which the ply process has been applied, whereby the binder solution is easily added in the thickness direction of the sheet, and the binder solution is uniformly applied to the sheet surfaces. In this way, by spraying the binder solution on the external surface(s) of the ply continuous sheet 1B, the toilet cleaning sheet 100 becomes in a state in which a content of the water-soluble binder increases, from the center in the thickness direction (when applying to both surfaces) or from the surface to which the binder solution is not applied (when applying to one surface), towards the surface(s) to which the binder solution is applied. Therefore, it is possible to produce the toilet cleaning sheet 100, having enhanced surface strength, and that is not easily damaged even when being used in vigorous rubbing, while ensuring sufficient hydrolysablity.

(Drying Process)

Next, the drying process (S4) of the embodiment will be described. In the drying process (S4), as illustrated in FIG. 6, insoluble liquid components in the binder solution of the continuous sheet 1C described above are evaporated by the drying facility 4 to fix active components, CMC in particular, to the fiber. Here, because the impregnation amount of the binder solution decreases towards inside from the external surface(s) of the continuous sheet 1C in the thickness direction, the fixation amount of CMC decreases towards inside in the thickness direction. Hence, when the chemical solution is added in the finishing process (S7) that will be described later below, towards inside in the thickness direction, a cross-linking reaction is less likely to occur and voids increase, and therefore the chemical solution can be trapped inside the sheet. Thereby, it is possible to obtain the toilet cleaning sheet 100 that does not easily dry. As the drying facility 4, a dryer facility with a hood that supplies hot air to the continuous sheet 1C to dry the continuous sheet 1C can be used. It should be noted that, in order to cause the sheets to more firmly adhere to each other, pressing rollers or turning rollers may be installed and then the continuous sheet 10 is passed through the pressing rollers or the turning rollers before the drying process (S4).

Further, as the drying facility described above, a facility that emits an infrared ray may be used. In this case, a plurality of infrared ray emitting parts are arranged in parallel in the conveying direction of the above described continuous sheet 10, and infrared rays are emitted to the conveyed continuous sheet 10 to dry the sheet 10. Because water is heated and dried by the infrared rays, the sheet can be uniformly dried and generation of wrinkles in the subsequent slitting/winding process can be prevented relative to a dryer using hot air.

(Slitting/Winding Process)

Next, the slitting/winding process (S5) of the embodiment will be described. In the slitting/winding process (S5), in order to obtain a web for when the continuous hydrolysable sheet 1D, to which the ply process has been applied, is processed by an off-line processing machine, while tension of the continuous hydrolysable sheet 1D, dried in the above described drying process (S4) and to which CMC has been fixed, is adjusted, the sheet is slit by a slitter 5 at a predetermined width and wound in a winder facility 6. A winding speed is appropriately determined in consideration of the ply process (S2), the solution adding process (S3), and the drying process (S4). It should be noted that if the winding speed is too fast, the sheet may break, and if the winding speed is too slow, the sheet may wrinkle. In the slitting/winding process (S5), the continuous hydrolysable sheet 1D, to which the ply process has been applied, is pressure-joined such that the continuous hydrolysable sheet 1D is further unified to be a single sheet.

(Embossing Process)

Next, the embossing process (S6) of the embodiment will be described. In the embossing process (S6), as illustrated in FIG. 7, the continuous hydrolysable sheet 1D, fed from the secondary web roller 11, is embossed by embossing rollers 12 to form predetermined shapes on the entire sheet surface. The sheet is embossed in order to enhance design quality as well as to enhance strength, bulkiness, wiping performance, and the like of the sheet.

(Finishing Process)

Next, the finishing process (S7) of the embodiment will be described. In the finishing process (S7), as illustrated in FIG. 7, a series of processes, which include a process of cutting the embossed sheet 1E, a process of folding the respective cut sheets, impregnating the respective folded sheets with the above described chemical solution, and packaging the respective sheets impregnated with the above described chemical solution, are performed in a finishing facility 13. Here, it is preferable to use a polyvalent metal ion in the cross-linking agent included in the chemical solution, in a case where CMC is used as the water-soluble binder. In particular, it is preferable to use one kind or two or more kinds of polyvalent metal ions selected from among the group consisting of alkaline earth metals, manganese, zinc, cobalt, and nickel, in terms of sufficiently bonding the fibers to develop strength for withstanding use and of having sufficient hydrolyzability. It is particularly preferable to use ions of calcium, strontium, barium, zinc, cobalt, and nickel among these metal ions. As described above, through the respective processes, the toilet cleaning sheet 100 is produced.

A method for producing the toilet cleaning sheet 100 described above may include a ply process that is applied to a plurality of sheets of base paper not containing a water-soluble binder; a solution adding process of adding a binder solution to a sheet to which the ply process has been applied; a drying process of drying the sheet to which the binder solution has been added; and a winding process of slitting and winding the sheet, dried in the drying process, at a predetermined width, wherein, spray nozzles provided corresponding to both external surfaces of the sheet, to which the ply process has been applied, spray the binder solution on the corresponding surfaces in the solution adding process. It should be noted that, in addition to applying the ply process to the plurality of sheets of base paper not containing a water-soluble binder, the ply process may be applied to a plurality of sheets of base paper not containing a water-soluble binder in the above described ply process.

PRACTICAL EXAMPLE

Next, results of evaluating wiping performance, surface strength, flexibility, contact areas of conventional toilet cleaning sheets to which circular (rhomboid grid, rectangular grid) embossments were applied and toilet cleaning sheets 100 of the embodiment to which two types of embossments EM11 and EM12 were applied will be described (with reference to table 1).

It should be noted that the practical example 1 in the table 1 includes two types of embossments EM11 and EM12 having shapes such as circles or squares of which lengthwise-to-lateral ratios are not the same, and the practical example 2 includes two types of embossments EM11 and EM12 having shapes such as ellipses or rectangles of which lengthwise-to-lateral ratios are the same.

Figure 8A:
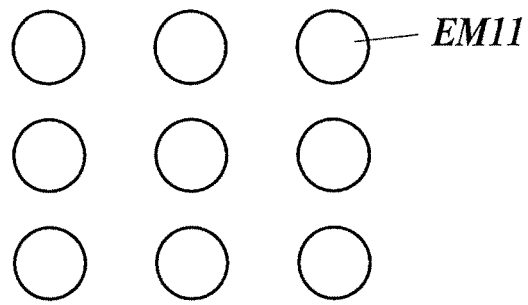
FIG. 8A is an explanatory diagram illustrating an example of the arrangement and the shape of embossments of a practical example and a comparative example.
Figure 8B:
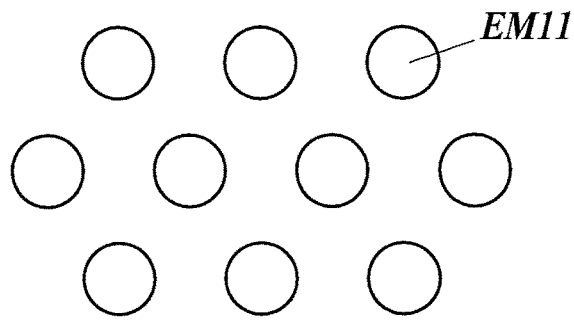
FIG. 8B is an explanatory diagram illustrating an example of the arrangement and the shape of embossments of a practical example and a comparative example.

Specifically, as illustrated in FIG. 8A, each embossment EM11 of the comparative example 1 has a round shape and the embossments EM11 are arrayed in a rhomboid grid. As illustrated in FIG. 8B, each embossment EM11 of the comparative example 2 has a round shape and the embossments EM11 are arrayed in a rectangular grid.

Figure 8C:
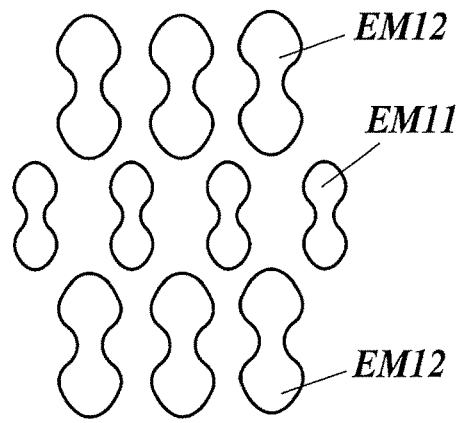
FIG. 8C is an explanatory diagram illustrating an example of the arrangement and the shapes of embossments of a practical example and a comparative example.
Figure 8D:
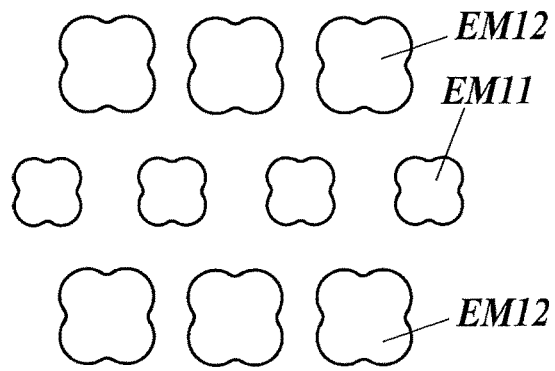
FIG. 8D is an explanatory diagram illustrating an example of the arrangement and the shape of embossments of a practical example and a comparative example.

Conversely, as illustrated in FIG. 8C, the two types of embossments EM11 and EM12 of the practical example 1 have lengthy elliptical shapes, have shapes having narrow parts in a short direction (called gourd shapes), and are arrayed in a rhomboid grid. As illustrated in FIG. 8D, the two types of embossments EM11 and EM12 of the practical example 2 have round shapes, have shapes having narrow parts in a long direction and in a short direction, and are arrayed in a rhomboid grid.

TABLE 1

| | | WET STATE | | | | |
|---|---|---|---|---|---|---|
| | | WIPING PERFORMANCE (RLU) | FLEXIBILITY (mm) | CONTACT AREA ($mm^2$) | HYDROLYZABILITY (SECONDS) | TOTAL JUDGEMENT |
| PRACTICAL EXAMPLE 1 | EVALUATION | 768 VERY GOOD | 27.0 GOOD | 24.0 GOOD | 60 GOOD | VERY GOOD |
| PRACTICAL EXAMPLE 2 | EVALUATION | 1734 GOOD | 22.5 GOOD | 20.0 GOOD | 70 GOOD | GOOD |
| COMPARATIVE EXAMPLE 1 | EVALUATION | 2261 FAIR | 41.8 POOR | 3.1 FAIR | 60 GOOD | POOR |
| COMPARATIVE EXAMPLE 2 | EVALUATION | 4942 POOR | 40.5 POOR | 3.1 FAIR | 60 GOOD | POOR |

<Application Conditions>
Base paper: pulp 100% (when PVA fiber is blended, pulp is 99.5% to 99.9% and PVA fiber is blended at 0.1% to 0.5%)
Basis weight (dry state): 90 g/m$^2$ (two-ply)
Embossing Conditions:
  Embossment EM11: 3 mm in MD direction, and 6 mm in CD direction (practical example 1)
  Embossment EM11: 3 mm in MD and CD directions (practical example 2)
  Embossment EM11: diameter 3 mm (comparative example 1 and comparative example 2)
  Embossment EM12: 5 mm in MD direction, and 8 mm in CD direction (practical example 1)
  Embossment EM12: 5 mm in MD and CD directions (practical example 2)
  Pitch: 5 mm in MD direction and 8 mm in CD direction (practical example 1)
  Pitch: 5 mm in MD and CD directions (practical example 2)
  Pitch: 3 mm in MD and CD directions (comparative example 1 and comparative example 2) Components of chemical solution: polyhydric alcohol, surfactant, sterilizing agent, orange extract, silicone Wiping performance, flexibility, and contact areas were evaluated in using the finished toilet cleaning sheets 100. It should be noted that, as described in the embodiment, the toilet cleaning sheets 100 were wet by the chemical solution applied, and were evaluated supposing cases of being unfolded to be used.

In evaluating the wiping performance, a muddy stool that is 1 g of simulated dirt was placed on a tile piece of about 200 mm×200 mm, and a test piece of 100 mm×100 mm was placed on the muddy stool, and a load was applied by a weight of 1 kg. Then, after pushing the weight to shuttle right and left is repeated three times, leftover dirt was measured and evaluated by an ATP wiping inspection apparatus ("POOR" for when a RLU was greater than or equal to 3000, "FAIR" for when a RLU was greater than or equal to 2000 and less than 3000, "GOOD" for when a RLU was less than 2000, and "VERY GOOD" for when a RLU was less than 1000). As illustrated in the table 1, the comparative example 1 had poor wiping performance, the comparative example 2 had good wiping performance, and the practical examples 1 and 2, to which the two types of embossments EM11 and EM12 were applied, had very good wiping performance.

Here, components of the muddy stool that is simulated dirt were obtained by mixing a polishing powder, artificial urine, carboxymethylcellulose (CMC), glycerin, and a surfactant at predetermined blending amounts, buckwheat flour.

Further, the ATP wiping inspection apparatus is an apparatus that emits light by combining ATP (adenosine triphosphate) included in cells of all creatures with an enzyme and measures the resulting amount of luminescence (Relative Light Unit: RLU).

In evaluating the flexibility, four test pieces (toilet cleaning sheets) cut in the MD direction to be 25 mm×120 mm were prepared to evaluate, based on a cantilever method (JIS L 1913:2010), distances to a slope which the test pieces contact ("POOR" for 35 mm or more, or less than 20 mm, and "GOOD" for 20 mm or more and less than 30 mm). As illustrated in the table 1, the comparative examples 1 and 2 did not have flexibility, and the practical examples 1 and 2, to which the two types of embossments EM11 and EM12 were applied, were flexible.

In evaluating the contact areas, acrylic paint was applied to an acrylic resin plate, a test piece of 10 cm×10 cm was placed on the paint, and a weight of 1 kg was further placed. After the elapse of 30 seconds, a color area (per 1 cm$^2$) attached to embossments was measured and to be evaluated ("POOR" for when a contact area of a colored part was greater than or equal to 30 mm$^2$, "FAIR" for when a contact area of a colored part was greater than or equal to 25 mm$^2$ and less than 30 mm$^2$ or less or equal to or less than 15 mm$^2$, "GOOD" for when a contact area of a colored part was greater than or equal to 15 mm$^2$ and less than 25 mm$^2$). As illustrated in the table 1, the comparative examples 1 and 2 had somewhat small contact areas, and the practical examples 1 and 2, to which the two types of embossments EM11 and EM12 were applied, had large contact areas.

In this way, by applying two types of embossments EM11, each of which has a curved surface protruding part, and embossments EM12, each of which has a planar protruding part, a contact area with an object to be cleaned or the like can be increased. Therefore, surface strength of embossed household tissue paper can be maintained and wiping performance is high such that prominent effects can be obtained. It should be noted that even such embossments having flexibility have characteristics of withstanding tension in a process after being embossed.

In evaluating the hydrolyzability, a test was conducted to confirm whether hydrolyzability was affected by a difference of embossing. The test method was measured according to JIS P 4501(2006) 4.5 "ease of unraveling". As illustrated in the table 1, it was confirmed that each of the practical examples 1 and 2 and the comparative examples 1 and 2 satisfies a standard for hydrolyzability (to be unraveled within 100 seconds).

As described above, by forming, on household tissue paper obtained by applying a ply process to two or more sheets of base paper, two types of embossments, which are embossments each of which has a curved surface shaped protruding part and embossments each of which has a planar shaped protruding part, a contact area with an object to be cleaned or the like is increased. Therefore, it is possible to enhance surface strength of the household tissue paper being embossed and to provide the household tissue paper having high wiping performance.

Next, results of evaluating damage for when a toilet cleaning sheet (practical example) of the embodiment to which CMC was applied from the outside was used in vigorous rubbing and of evaluating damage a conventional toilet cleaning sheet (comparative example) uniformly impregnated with CMC was used in vigorous rubbing will be described with reference to table 2.

<Application Conditions>

PRACTICAL EXAMPLE

Material of base paper: pulp 100%
Basis weight: 45 g/m$^2$
Ply number: two-ply
Water-soluble binder and its content: CMC 1.2 g/m$^2$ (Spray application)
Components of chemical solution: surfactant, sterilizing agent, perfume, glycol ether, etc.
Embossing process: not applied

COMPARATIVE EXAMPLE

Material of base paper: pulp 100%
Basis weight: 45 g/m$^2$
Ply number: two-ply
Water-soluble binder and its content: CMC 1.2 g/m$^2$ (uniform impregnation)
Components of chemical solution: surfactant, sterilizing agent, perfume, glycol ether, etc.
Embossing process: not applied <Test Method>

Each toilet cleaning sheet was folded into three and a measured portion was rubbed by a fastness rubbing tester to measure the number of rubs at which point damage such as tearing or fuzzing was visually identified on a paper surface. It should be noted that the test conditions by the fastness rubbing tester were as follows.

Pendulum: PP band (Sekisui Jushi Corporation, part number 15.5K)
Load: 200 gf
Speed is 30 cpm (30 round-trips per minute) and stroke is 120 mm

TABLE 2

| PRACTICAL EXAMPLE | | | | | |
| CMC-APPLIED SURFACE | | CMC-NON-APPLIED SURFACE | | COMPARATIVE EXAMPLE | |
| MD | CD | MD | CD | FRONT · MD | BACK · MD |
| 140 | 180 | 12 | 20 | 32 | 31 |

As illustrated by the results in the table 2, it was found that the surface to which CMC was applied in the practical example has greater surface strength than that of the comparative example, and damage such as tearing and fuzzing for when being used in vigorous rubbing was extremely less likely to occur in the surface, to which CMC was applied in the practical example. That is, according to the embodiment, it was found that a hydrolysable sheet, in which the content of a water-soluble binder is increased towards the front surface and/or the back surface by applying a solution containing the water-soluble binder to either or both of the external surfaces of a base paper sheet, has hydrolysablity securely and is less likely to be torn even when being used in vigorous rubbing.

Next, results of evaluating sterilizing effects of hydrolysable sheets (toilet cleaning sheets) of the embodiment will be described with reference to table 3.

<Application Conditions>

In the practical examples 1 and 2, the toilet cleaning sheets 100, produced by the above described production method, were used to evaluate sterilizing effects based on the following evaluation method.

Figure 10:
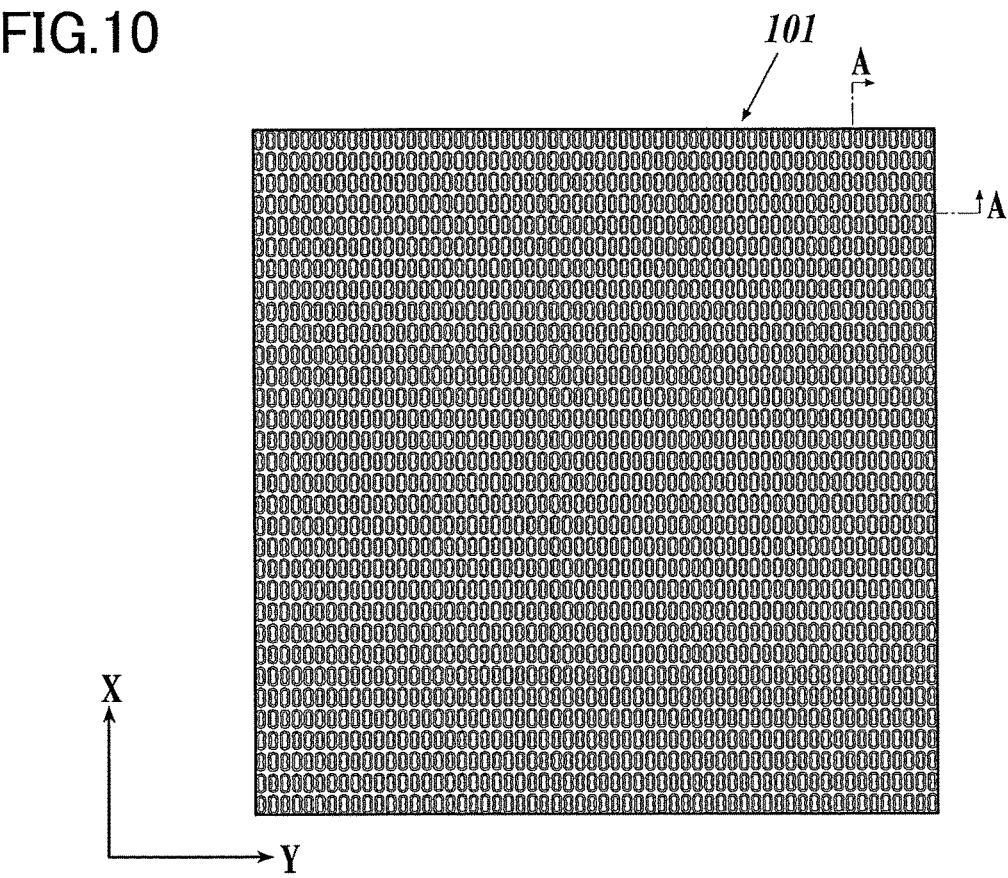
FIG. 10 is a plan view illustrating another example of a toilet cleaning sheet according to the embodiment.

Basis weight of base paper sheet (practical examples 1 and 2): 90 gsm (45 gsm×2)
Impregnation rate of chemical solution (practical examples 1 and 2): 200% by weight with respect to the weight of base paper sheet
Components of chemical solution (practical example 1): propylene glycol 3%, propylene glycol monomethyl ether 13%, benzalkonium chloride 0.2%, zinc sulfate 1%, surfactant, perfume, preservative, etc. 0.7%, water 82.1%
Components of chemical solution (practical example 2): propylene glycol 5%, propylene glycol monomethyl ether 10%, benzalkonium chloride 0.2%, zinc sulfate 1%, surfactant, perfume, preservative, etc. 0.7%, water 83.1%
Embossed pattern (practical examples 1 and 2): pattern illustrated in FIG. 10 and FIG. 12 and paragraph 0118, which will be described later below Conversely, in a comparative example, CMC was added in a papermaking process such that CMC distributed uniformly in a thickness direction of the prepared base paper. Then, a two-ply sheet of the base paper, to which the CMC was added, was made by the above described ply process. Subsequently, a toilet cleaning sheet, produced through a drying process, a slitting/winding process, an embossing process, and a finishing process in a way similar to the above described examples, was used to evaluate sterilizing effects based on the following evaluation method.

Basis weight of base paper sheet (comparative example): 90 gsm (45 gsm×2)
Impregnation rate of chemical solution (comparative example): 200% by weight with respect to the weight of base paper sheet
Components of chemical solution (comparative example): propylene glycol 5%, propylene glycol monomethyl ether 10%, benzalkonium chloride 0.2%, zinc sulfate 1%, surfactant, perfume, antiseptic and others 0.7%, water 83.1%
Embossed pattern (comparative example): pattern illustrated in FIG. 10 and FIG. 12 and paragraph 0118, which will be described later below <Evaluation Method>

According to the testing method of sterilizing performance of wet wipes (established on Apr. 1, 2015 supervising editor: Kourai, Hiroki, professor emeritus at Tokushima University), sterilizing effects of the respective toilet cleaning sheets of the above described practical examples 1 and 2 and comparative example were evaluated. Note that the overall judgement was "VERY GOOD" when both sterilizing rates of *Escherichia coli* and *Staphylococcus aureus* were higher than or equal to 99.99% (sterilization values were higher or equal to 4), the overall judgement was "GOOD" when both the sterilizing rates were higher than or equal to 99.9% (sterilization values were higher or equal to 3), the overall judgement was "FAIR" when both the sterilizing rates were higher than or equal to 99% (sterilization values were higher or equal to 2), and the overall judgement was "POOR" when both the sterilizing rates were less than 99% (sterilization values were less than 2).

TABLE 3

| | | PRACTICAL EXAMPLE 1 | PRACTICAL EXAMPLE 2 | COMPARATIVE EXAMPLE |
|---|---|---|---|---|
| STERILIZING ACTIVITY VALUE | ESCHERICHIA COLI | >4.1 | >4.4 | >4.1 |
| | STAPHYLOCOCCUS AUREUS | 3.9 | >4.2 | 2.5 |
| TOTAL JUDGEMENT | | GOOD | VERY GOOD | FAIR |

As illustrated by the results in the table 3, while the overall judgement of the sterilizing effects of the comparative example was "FAIR", the overall judgement of the sterilizing effects of the practical example 1 was "GOOD", and the overall judgement of the sterilizing effects of the practical example 2 was "VERY GOOD". It was confirmed that the sterilizing effects of the practical examples 1 and 2 were enhanced relative to the comparative example.

As described above, according to the embodiment, a state is made in which the content of CMC increases from inside towards the front surface and back surface in the thickness direction of the base paper sheet, which is the base material of the toilet cleaning sheet 100. Thereby, when the base paper sheet is impregnated with the chemical solution, a large amount of the chemical solution can be trapped inside the base paper sheet. Accordingly, by applying a pressure to the toilet cleaning sheet 100 at the time of wiping work, a large amount of the chemical solution containing the sterilizing agent is discharged to a target object. Thereby, bacteria attached to the target object can be preferably killed and removed, and the effect of sterilizing the target object can be enhanced.

Next, use evaluations on robustness obtained by evaluating damage for when a toilet cleaning sheet (practical example) of the embodiment to which CMC was applied from the outside was used in vigorous rubbing and evaluating damage conventional toilet cleaning sheets (comparative example 1 and 2) uniformly impregnated with CMC was used in vigorous rubbing will be described with reference to table 4.

<Application Conditions>

PRACTICAL EXAMPLE

Material of base paper: pulp 100%
Basis weight: 45 g/m²
Ply number: two-ply
Water-soluble binder and its content: CMC 1.2 g/m² (Spray application)
Components of chemical solution: surfactant, sterilizing agent, perfume, glycol ether, water etc.
Impregnation rate of chemical solution: 200%
Embossing process: applied

COMPARATIVE EXAMPLE 1

Material of base paper: pulp 100%
Basis weight: about 45 g/m²
Ply number: two-ply
Water-soluble binder and its content: CMC 1.0 g/m²
Components of chemical solution: surfactant, sterilizing agent, perfume, glycol ether, water etc.
Impregnation rate of chemical solution: 200%
Embossing process: applied

COMPARATIVE EXAMPLE 2

Material of base paper: pulp 100%
Basis weight: 30 g/m²
Ply number: three-ply
Water-soluble binder and its content: PVA 1.5 g/m²
Components of chemical solution: surfactant, sterilizing agent, perfume, ethanol, water etc.
Impregnation rate of chemical solution: 200%
Embossing process: applied <Test Method>

A test piece (toilet cleaning sheet) was cut in the MD direction and the CD direction at a width 75 mm×a length 240 mm, without peeling off the ply, and folded into three such that both edge areas in the width direction are overlapped. Then, a measured portion was rubbed by a rubbing fastness tester to measure the number of rubs at which point damage such as tearing or fuzzing was visually identified on the paper surface. This measurement was conducted three times for each in the MD direction and the CD direction. Then, the three measured values were averaged for each. It should be noted that the test conditions by the fastness rubbing tester were as follows.

Fastness rubbing tester: Product number AB301 made by Tester Sangyo CO., LTD
Friction member:
  Shape 20 mm×R50 mm
  Load 200 gf (including arm, white cotton cloth stopper)
  Load per unit area 50 gf/cm² (load 200 gf/contact area 4.0 cm²
  One sheet of PP band for cotton cloth stopper of friction member (Sekisui Jushi Corporation, part number 19K (width 15 mm×length 60 mm)) is fixed to the friction member with a screw stopper so as not to generate a clearance and not to generate wrinkles.
Stage:
  Shape R200 mm
  Stroke 120 mm
  Reciprocating speed: 30 cps
  Test piece (toilet cleaning sheet): width 25 mm (width 75 mm was folded into three without peeling off ply)×length 240 mm (stage side)
Test procedure:
  (1) Attach a test piece to the stand not to slack.
  (2) Place gently the friction member down on the stand.
  (3) Push a start SW to start the test.
Judging method: Check a state of the test piece by swinging 10 times each, and measure the number of swings at which point damage such as tearing or fuzzing was confirmed.

In consideration of a situation in which a toilet cleaning sheet is used in practice, that is, in consideration of a state in which an edge or the like of a toilet bowl is textured due to attached dirt, a PP band, to which surface a mesh pattern is applied, was used as a pendulum in the above described abrasion resistance test. Thereby, an environmental test can be conducted in consideration of a practical use of a toilet cleaning sheet, and it is possible to conduct a reliable test as to whether a toilet cleaning sheet can endure at the time of use in practice.

<Evaluating Method>

A test was conducted to have 80 users actually use each of the practical example, and the comparative examples 1 and 2 to answer on a degree of satisfaction with robustness for the use, on a five-GRADE EVALUATION OF "SATISFIED", "MODERATELY SATISFIED", "FAIR", "MODERATELY DISSATISFIED", AND "DISSATISFIED".

in percentage, proportions of users who conducted the evaluations. Further, the averages illustrated in the table were values obtained by multiplying scores corresponding to respective evaluations by the numbers of answers of the evaluations, where a score of "SATISFIED" is 5, a score of "MODERATELY SATISFIED" is 4, a score of "FAIR" is 3, a score of "MODERATELY DISSATISFIED" is 2, and a

TABLE 4

|  |  |  | PRACTICAL EXAMPLE | COMPARATIVE EXAMPLE 1 | COMPARATIVE EXAMPLE 2 |
|---|---|---|---|---|---|
| USE EVALUATION ON ROBUSTNESS (n = 80) (UNIT: %) |  | SATISFIED | 82 | 25 | 0 |
|  |  | MODERATELY SATISFIED | 12 | 59 | 50 |
|  |  | FAIR | 2 | 13 | 50 |
|  |  | MODERATELY DISSATISFIED | 4 | 3 | 0 |
|  |  | DISSATISFIED | 0 | 0 | 0 |
|  |  | AVERAGE | 4.7 | 4.1 | 3.5 |
| SURFACE STRENGTH MEASUREMENT (UNIT: TIMES) | MD | AVERAGE VALUE | 50 | 34 | 19 |
|  |  | MEASURED VALUE 1 | 47 | 28 | 19 |
|  |  | MEASURED VALUE 2 | 51 | 33 | 21 |
|  |  | MEASURED VALUE 3 | 52 | 40 | 17 |
|  | CD | AVERAGE VALUE | 59 | 30 | 17 |
|  |  | MEASURED VALUE 1 | 52 | 23 | 17 |
|  |  | MEASURED VALUE 2 | 68 | 32 | 18 |
|  |  | MEASURED VALUE 3 | 56 | 35 | 16 |

As illustrated in the test results in the table 4, it was found that the practical example had surface strength stronger than those of the comparative examples 1 and 2, and damage, such as tearing and fuzzing, in vigorous rubbing under an environment supposing a practical use was less likely to occur in the practical example. Also, in the practical example, the average values for both the MD direction and the CD direction were greater than the numerical value (40 times) as the standard as to whether a toilet cleaning sheet can endure at the time of practical use. Thus, it was found that the practical example can endure at the time of practical use. In contrast, in the comparative examples 1 and 2, the average values for both the MD direction and the CD direction were lower than the numerical value as the standard. Thus, it was found that the comparative examples 1 and 2 cannot endure at the time of practical use. Further, it was found that the values for the CD direction of the practical example were well beyond the standard (40 times) as to whether a toilet cleaning sheet can endure at the time of practical use. Therefore, by making a toilet cleaning sheet such that a user can discriminate which direction is the CD direction of the toilet cleaning sheet (by adding an arrow that represents the CD direction to a paper surface of the toilet cleaning sheet, for example), the user becomes able to match a stroke direction of his or her hand and the CD direction to use the toilet cleaning sheet when wiping a toilet bowl. Thus, it is possible to further prevent the toilet cleaning sheet from being torn during cleaning.

Further, as illustrated in the test results in the table 4, it was found that, in the practical example, a proportion of users giving "SATISFIED" as the answer was extremely higher than those of the comparative examples 1 and 2. That is, by making a numerical value of surface strength, which is a standard as to whether a toilet cleaning sheet can endure a practical use as the practical example, greater than or equal to 40 trials in the above described test, it is confirmed that the toilet cleaning sheet has sufficient hydrolyzability and does not tear even when used in vigorous rubbing. It should be noted that the numerical values corresponding to the respective use evaluations illustrated in the table 4 express, score of "DISSATISFIED" is 1, totaling the scores multiplied, and dividing the total scores by the number of respondents.

Specific descriptions have been provided above based on the embodiment of the present invention, but the present invention is not limited to the above described embodiment, and may be modified without departing from the scope of the invention. In the described embodiment of the present invention, an example is illustrated in which each of the embossments EM11 has the curved-shaped protruding part PR21 and each of the embossments EM12 has the planar-shaped protruding part PR22, but the embossments are not necessarily limited to these shapes. For example, protruding parts of the embossments EM11 and the embossments EM12 may have planar shapes of differing heights. Alternatively, for example, each embossment EM11 may have a planar-shaped protruding part, and each embossment EM12 may have a curved-shaped protruding part.

In other words, a protruding part of each embossment may have any shape as long as two types of embossments (which are first embossments and second embossments) have protruding parts of different shapes and the second embossments are arranged around the first embossments.

Further, in the described embodiment of the present invention, the embossments EM12, each of which has the planar protruding part, are arranged between the embossments EM11, each of which has the curved surface protruding part, but the embossments EM11 may intersect with each other.

Further, in the described embodiment of the present invention, all the embossments EM11 and EM12 protrude towards the near side with respect to the drawing of FIG. 1, but embossments EM11 and EM12 having a convex shape towards the near side with respect to the drawing and embossments EM11 and EM12 having a concave shape towards the near side with respect to the drawing may be alternately arranged.

Figure 9:
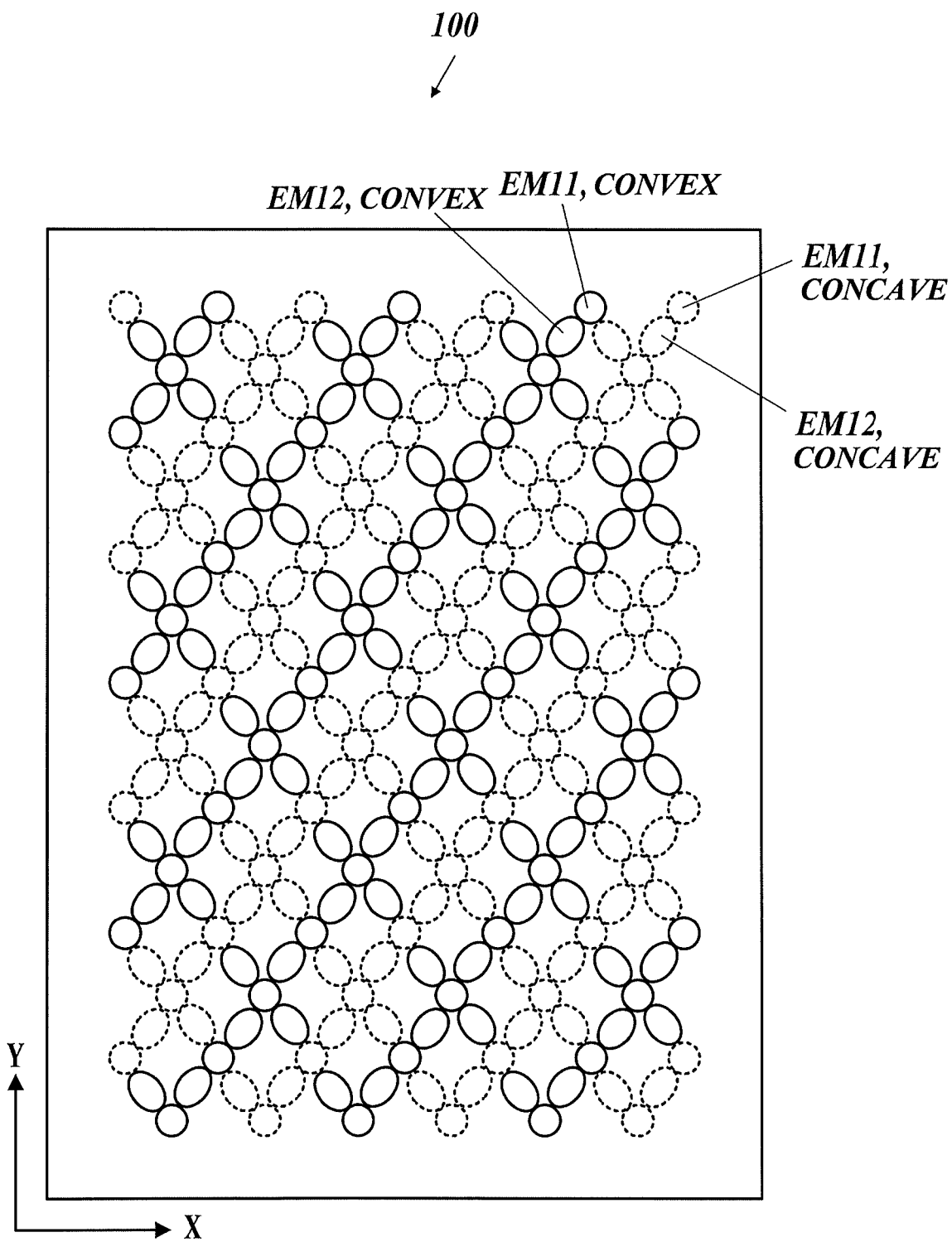
FIG. 9 is a plan view illustrating another example of a toilet cleaning sheet according to the embodiment.

For example, as illustrated in FIG. 9, embossments EM11 and EM12 (portions illustrated by solid lines), each of which has a convex shape towards the near side with respect to the drawing of FIG. 9, and embossments EM11 and EM12 (portions illustrated by dashed lines), each of which has a concave shape with respect to the near side of the drawing of FIG. 8, may be alternately arranged to provide a hydrolysable sheet that has high wiping performance for both surfaces of the toilet cleaning sheet 100 as well as enhancing surface strength of the hydrolysable sheet by being embossed.

Further, in the described embodiment of the present invention, the protruding parts PR21 of the embossments EM11 and the protruding parts PR22 of the EM12 are close to cohere to be formed as the conjoined embossment EM21. However, the protruding parts PR21 of the embossments EM11 and the protruding parts PR22 of the EM12 may be simply close to each other without cohering.

Further, in the described embodiment of the present invention, an example is illustrated in which each embossment EM11 has a circular shape or an elliptical shape, but the shape of each embossment may be any shape, such as a rectangular shape or a polygonal shape.

Further, it is preferable that heights HT21 and HT22 of the protruding parts of the embossment EM11 and EM12 in FIG. 3 are 0.40 mm to 0.75 mm, for example. It should be noted that the surfaces are three-dimensionally measured by a digital microscope made by KEYENCE Co. to measure the heights of the protruding parts of the embossments, for example.

For example, when the heights are less than 0.40 mm, friction at the time of wiping becomes stronger and the wiping becomes difficult. When the heights exceed 0.75 mm, the shapes of the embossments EM11 and EM12 becomes easily deformed at the time of being packaged, and the appearance becomes worse.

Figure 11:
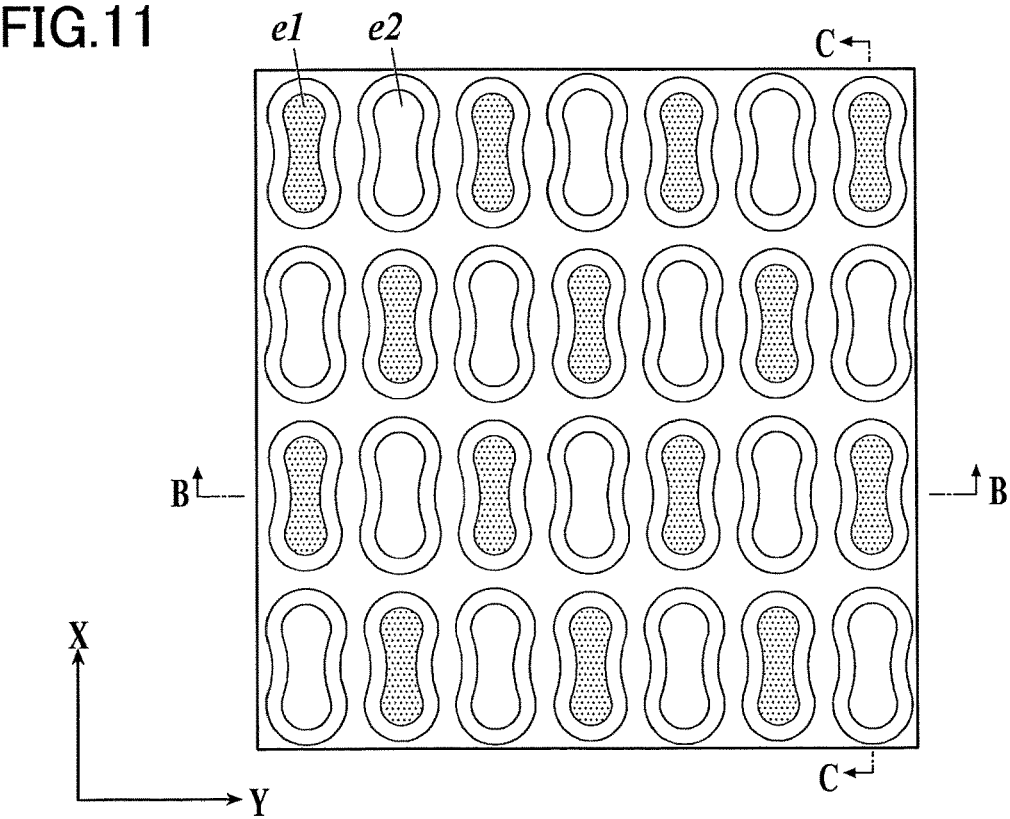
FIG. 11 is an enlarged view of part A-A of FIG. 10.
Figure 12A:
FIG. 12A is a cut end view taken through B-B of FIG. 11.
Figure 12B:
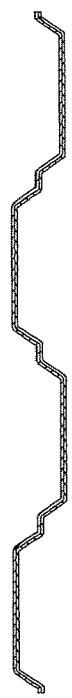
FIG. 12B is a cut end view taken through C-C of FIG. 11.

Further, an embossed pattern of toilet cleaning sheets are not limited to the above described pattern. FIG. 10 is a plan view of a toilet cleaning sheet 101 obtained by changing only the embossed pattern of the toilet cleaning sheet 100. FIG. 11 is an enlarged view of part A-A of FIG. 10. FIG. 12A is a cut end view taken through B-B of FIG. 11. FIG. 12B is a cut end view taken through C-C of FIG. 10.

In FIGS. 10 to 12, concave portions e2 have shapes obtained by inverting convex portions e1. An embossed pattern is formed such that the convex portions e1 and the concave portions e2 are alternately arranged in each of many lines and the convex portions e1 and the concave portions e2 in the adjacent lines are arrayed to be shifted with respect to each other by one-half pitch. In this way, by alternately forming the convex portions e1 and the concave portions e2 in both the longitudinal direction and the lateral direction, wiping performance of dirt can be enhanced relative to an embossed pattern in which convex portions are arranged in one line and convex portions are arranged in one line. It should be noted that the shapes of the convex portions e1 and the concave portions e2 are not particularly limited, and shapes such as circular shapes, elliptic shapes, and polygonal shapes may also be used. These shapes may be combined.

Further, although the binder solution is applied, to the continuous dry base paper 1A continuously fed from the primary web roller 1, by the spray method in the described embodiment of the present invention, the binder solution may be applied by a doctor chamber method (which is a transferring facility that includes two plate rollers to be a pair with respect to one backup roller, anilox rollers to be paired with respect to the respective plate rollers, and doctor chambers that adds a chemical solution to the respective anilox rollers) and/or a three-rollers method (which is a transferring facility that includes two plate rollers to be a pair with respect to one backup roller, anilox rollers to be paired with respect to the respective plate rollers, a dip roller that adds a chemical solution to each anilox roller, and a pan that adds the chemical solution to the dip rollers). That is, a method of producing a hydrolysable sheet obtained by applying a ply process to a plurality of sheets of base paper (continuous dry base paper 1A) may include a solution adding process that adds (transfers) the binder solution to at least one surface of the base paper sheet to be the front surface and the back surface of the hydrolysable sheet among the plurality of sheets of base paper not containing a water-soluble binder, a ply process that is applied to the plurality of sheets of base paper, a drying process that dries the sheet to which the ply process has been applied, and a winding process that slits and winds the sheet dried in the drying process at a predetermined width such that the solution adding process transfers, from a printing machine provided corresponding to at least one surface of the base paper to be the front surface and the back surface of the hydrolysable sheet, the binder solution on corresponding base paper. It should be noted that, in the above described solution adding process, the binder solution may be added to at least one surface of base paper to be a front surface and a back surface of a hydrolysable sheet of a plurality of sheets of base paper, not containing a water-soluble binder, or the binder solution may be added to at least one surface of base paper to be a front surface and a back surface of a hydrolysable sheet of a plurality of sheets of base paper, containing a water-soluble binder.

In a simple roller transfer, a chemical solution having extremely high concentration is required to add a predetermined amount of the chemical solution. Therefore, a uniformly transfer cannot be performed through the roller transfer because viscosity of such a chemical solution is high. Further, if the concentration is lowered to lower the viscosity, the desired amount cannot be added as described above. As described above, because it is very difficult to add a chemical solution to dry base paper, the doctor chamber method and/or the three-rollers method is adopted. By adopting the three-rollers method and/or the doctor chamber method providing plate rollers to be a pair with respect to one backup roller, a sufficient amount of a chemical solution can be added to dry base paper in total even when an additive amount by each plate roller is small. Further, because only a single backup roller is used, the chemical solution can be added extremely uniformly. This is because tension between an initial plate roller to the following roller is extremely stably constant because only a single backup roller is used. Therefore, the chemical solution can be added extremely uniformly to continuous base paper even when adding the chemical solution by the two plate rollers in two steps. Further, because an interval between two plate rollers is short, the chemical solution can be added by the next plate roller immediately after the chemical solution is added by the initial plate roller such that the chemical solution can be transferred uniformly without unevenness of addition. Such effects cannot be obtained by simply making a backup roller and a plate roller as a pair.

Further, because of being able to more uniformly and stably transfer a chemical solution in a width direction, it is more preferable to add the chemical solution by the doctor chamber method than by the three-rollers method. Furthermore, a drying process of drying the continuous paper to which the chemical solution has been added is included. As this drying step, it is preferable to indirectly dry the continuous paper without directly contacting the continuous paper, and an infrared lay emitting is particularly preferable. Generation of wrinkles is suppressed by the indirect drying. In particular, when emitting an infrared lay, because each location on the paper surface is uniformly dried, it is possible to effectively prevent wrinkles and distortions from being generated at the time of drying. In the following, the doctor chamber method will be described in detail as an example.

A transferring facility based on this doctor chamber method includes one plate roller with respect to one backup roller. An application processing speed for applying the binder solution is operated at 30 m/minute to 100 m/minute, and at 50 m/minute to 80 m/minute more preferably. If the speed is less than 30 m/minute, there is a problem that crepe extends becomes difficult to be processed in a subsequent process. Conversely, if the speed exceeds 100 m/minute, a sufficient transfer amount cannot be obtained, variation in wet strength or hydrolyzability is generated by variation in an applied amount in a width direction.

It is appropriate for the above described backup roller to have a diameter of 250 mm to 400 mm. If the diameter is less than 250 mm, a contact area between the plate roller and the backup roller becomes small and a stable application becomes impossible. Although there is no problem in production even if the diameter exceeds 420 mm, it is not preferable because the facility cost is excessively required.

Anilox rollers are respectively provided for the plate rollers to supply the binder solution to the plate rollers. Doctor chambers are provided for the anilox rollers to supply and add the binder solution to the anilox rollers. Further, with respect to the doctor chambers, snake pumps that add the binder solution to the doctor chambers are installed for both transferring supply and returning supply to solution pans of the anilox rollers such that the binder solution having high viscosity can be transferred to the doctor chambers.

The continuous dry base paper 1A fed from the primary web roller 1 is wounded on the backup roller via appropriate guide rollers, and appropriate tension and surface stability are added. Then, the binder solution is transferred by the plate rollers rolling on the continuous dry base paper 1A wounded on the backup roller. Here, seamless rollers of solid specifications without a concave/recess are used as the plate rollers to add the binder solution to the entire continuous dry base paper 1A like solid printing. The seamless roller used as the plate roller is formed by winding a rubber plate on a sleeve of a type roller, putting it into an oven, overheating and welding it, and polishing it. A material, hardness, color, and the like of the rubber plate used as material can be selected depending on a predetermined purpose.

Depending on concentration of the binder solution, it is preferable lines per inch and a cell capacity of the anilox roller, which transfers the binder solution to the plate roller, are 60 lines/inch to 120 lines/inch and 40 ml/m$^2$ to 90 ml/m$^2$. If the lines per inch are less than 60 lines/inch, the binder solution is excessively transferred to the plate roller. As a result, the binder solution may be unevenly added to the continuous dry base paper 1A from the plate roller. In contrast, if the lines per inch exceed 120 lines/inch, it becomes difficult to transfer the binder solution on the entire peripheral surface of the plate roller by a sufficient amount. Further, if the cell capacity is less than 40 ml/m$^2$, it becomes difficult to transfer the binder solution on the entire peripheral surface of the plate roller by a sufficient amount. If the cell capacity exceeds 90 ml/m$^2$, the yield rate is decreased. It should be noted, as a target of adding (transferring) the binder solution to continuous dry base paper 1A as described above, the binder solution is added (transferred) to only base paper to be the uppermost layer or the lowermost layer at the time of ply process. That is, for example, in a case of three-ply, the binder solution is not added (transferred) to continuous dry base paper 1A to be the middle layer.

Further, the binder solution is transferred on the continuous dry base paper 1A before applying the ply process in the above described doctor chamber method, the binder solution may be transferred, after applying the ply process, on the ply continuous sheet 1B to which the ply process has been applied. That is, a method of producing a hydrolysable sheet obtained by applying a ply process to a plurality of sheets of base paper (continuous dry base paper 1A) may include a ply process that is applied to a plurality of sheets of base paper not containing a water-soluble binder, a solution adding process that adds (transfers) the binder solution to the sheet to which the ply process has been applied, a drying process that dries the sheet to which the binder solution has been added, and a winding process that slits and winds the sheet dried in the drying process at a predetermined width such that the solution adding process transfers, from a printing machine provided corresponding to at least one external surface of the sheet to which the ply process has been applied, the binder solution on the corresponding external surface. It should be noted that the ply process may be applied to a plurality of sheets of base paper not containing the water-soluble binder or the ply process may be applied to a plurality of sheets of base paper containing the water-soluble binder. In this way, a binder solution having high viscosity can be applied by transferring the binder solution through the doctor chamber method. Therefore, it is possible to prevent the binder solution from penetrating inside the sheet. Thus, it becomes possible to fix CMC only on the sheet surface(s). It should be noted that for example, a coater for hot-melt resin coating may be used to coat the binder solution on the sheet surface(s), other than transferring the binder solution through the doctor chamber method. In such a case also, it becomes possible to fix CMC only on the sheet surface(s).

Further, in the described embodiment of the present invention, the binder solution is added in the solution adding facility illustrated in FIG. 6. However, the binder solution may be added in a papermaking process. That is, a method of producing a hydrolysable sheet obtained by applying a ply process to a plurality of sheets of base paper (continuous dry base paper 1A) may include a papermaking process of preparing the plurality of respective sheets of base paper such that the binder solution is added to wet paper being prepared in the papermaking process.

Specifically, in the papermaking process, for example, wet paper formed at a papermaking mesh is placed on a felt to be conveyed, and the wet paper on the felt is transferred to a Yankee dryer via a touching roller. Then, the wet paper being conveyed attached to the Yankee dryer is dried to obtain base paper. Here, the binder solution is sprayed from spray nozzles on the wet paper immediately after being transferred on the above described Yankee dryer. In this way, in a case where the binder solution is also added in the papermaking process, the overall strength of an obtained hydrolysable sheet can be enhanced, and the surface strength of the hydrolysable sheet can be further enhanced by further adding the binder solution in the solution adding process as a subsequent process.

Further, although CMC is used as the water-soluble binder in the described embodiment of the present invention, polyvinyl alcohol (PVA) may be used.

In addition, a detailed configuration of the toilet cleaning sheet 1 may be modified as appropriate without deviating from the scope of the present invention.

INDUSTRIAL APPLICABILITY

The present invention is preferably applicable to a field of producing household tissue paper and a hydrolysable sheet.

DESCRIPTION OF REFERENCE SYMBOLS

100, 101 toilet cleaning sheet
1 primary web roller
1A continuous dry base paper
1B ply continuous sheet
1C continuous sheet
1D continuous hydrolysable sheet
1E embossed sheet
2 overlapping part
3 spray nozzle
4 first drying facility
5 slitter
6 winder facility
11 secondary web roller
12 embossing roller
13 finishing facility
14 former
15 wire
16 suction box
17 first dry part
18 rotating drum
19 hood
20 upper conveyer belt
21 lower conveyer belt
22 vacuum roller
23 spray nozzle
24 second dry part
25 rotating drum
26 hood
EM11 embossment
EM12 embossment
EM13 embossment
PR21 protruding part
PR22 protruding part

The invention claimed is:

1. A hydrolysable sheet comprising a multi-ply base paper sheet that is substantially water-dispersible, the multi-ply base paper sheet containing pulp and a water-soluble binder and being impregnated with an aqueous chemical agent, wherein
a basis weight of the multi-ply base paper sheet is 30 gsm to 150 gsm,
a content of the water-soluble binder increases towards a front surface and/or a back surface,
first embossments and second embossments, arranged around the first embossments, are formed on an entire surface, a shape of a protruding part of each of the second embossments differing from a shape of a protruding part of each of the first embossments,
the hydrolysable sheet is obtained by impregnating the multi ply base paper sheet, to which a water-soluble binder is added, with a chemical solution,
a compounding ratio of softwood pulp to hardwood pulp is less than 1/1,
the content of the water-soluble binder increases towards the front surface and the back surface,
the chemical solution includes a cross-linking agent that causes the water-soluble binder to initiate a cross-linking reaction and a sterilizing agent, and
the multi ply base paper sheet is impregnated with the chemical solution at 150% to 300% by weight with respect to a weight of the base paper sheet.

2. The hydrolysable sheet according to claim 1, wherein the first embossments are arrayed in a rhomboid grid.

3. The hydrolysable sheet according to claim 1, wherein each of the second embossments is arrayed between two of the first embossments.

4. The hydrolysable sheet according to claim 1, wherein the first embossments contact the second embossments to form a conjoined embossment.

5. The hydrolysable sheet according to claim 1, wherein the hydrolysable sheet is a toilet cleaning sheet.

6. A hydrolysable sheet comprising a multi-ply base paper sheet that is substantially water-dispersible, the multi-ply base paper sheet containing pulp and a water-soluble binder and being impregnated with an aqueous chemical agent, wherein
a basis weight of the multi-ply base paper sheet is 30 gsm to 150 gsm,
when an abrasion resistance test by a rubbing fastness tester using a PP band as a pendulum is conducted three times both for an MD direction and a CD direction, two averages respectively for three measured values are greater than or equal to 40, and
first embossments and second embossments, arranged around the first embossments, are formed on an entire surface, a shape of a protruding part of each of the second embossments differing from a shape of a protruding part of each of the first embossments.

7. The hydrolysable sheet according to claim 6, wherein the average value for the MD direction is greater than or equal to 45, and the average value for the CD direction is greater than or equal to 50.

8. The hydrolysable sheet according to claim 6, wherein a content of the water-soluble binder increases towards a front surface and/or a back surface.

9. The hydrolysable sheet according to claim 6, wherein the MD direction is parallel to a conveying direction when the hydrolysable sheet is produced, and
the CD direction is perpendicular to the MD direction.

10. The hydrolysable sheet according to claim 9, wherein each of the measured values is a number of rubs at which point damage is visually identified on a surface of the hydrolysable sheet when the hydrolysable sheet is rubbed by a rubbing fastness tester.

* * * * *